United States Patent [19]
Stimson

[11] Patent Number: 5,570,754
[45] Date of Patent: Nov. 5, 1996

[54] TRACTOR AND TRAILER FOR MOVING LOADS IN CONFINED SPACES

[76] Inventor: Dwight S. Stimson, 233 River St., Norwell, Mass. 02061

[21] Appl. No.: 197,393

[22] Filed: Feb. 16, 1994

[51] Int. Cl.[6] ............................. B62D 5/07; B62D 5/28; B60K 7/00
[52] U.S. Cl. .......................... 180/234; 180/167; 280/402
[58] Field of Search ................................. 180/234, 209, 180/167, 169; 137/355.2, 355.12, 355.16, 355.25; 242/403, 390.5; 414/563, 909, 687; 340/825; 280/402, 415.1

[56] References Cited

U.S. PATENT DOCUMENTS

| | | | |
|---|---|---|---|
| 3,620,549 | 11/1971 | Miller et al. | 280/99 |
| 3,675,798 | 7/1972 | Carder et al. . | |
| 3,747,788 | 7/1973 | Petetin . | |
| 3,806,160 | 4/1974 | Duerksen | 280/444 |
| 4,066,093 | 1/1978 | Egerstrom | 242/403 |
| 4,090,581 | 5/1978 | Miner et al. | 180/140 |
| 4,149,643 | 4/1979 | Skala et al. | 280/402 |
| 4,161,329 | 7/1979 | Pilz et al. | 280/474 |
| 4,256,230 | 3/1981 | Clark, Jr. et al. . | |
| 4,317,252 | 3/1982 | Knowlton | 15/320 |
| 4,363,374 | 12/1982 | Richter et al. | 180/209 |
| 4,372,725 | 2/1983 | Moore et al. | 414/460 |
| 4,453,614 | 6/1984 | Allen et al. | 180/139 |
| 4,551,059 | 11/1985 | Petoia | 414/909 |
| 4,566,553 | 1/1986 | McCutcheon | 180/237 |
| 4,681,335 | 7/1987 | Ledermann et al. . | |
| 4,729,575 | 3/1988 | Eggen . | |
| 4,761,108 | 8/1988 | Kress et al. | 414/460 |
| 4,782,906 | 11/1988 | Kole | 180/23 |
| 4,821,810 | 4/1989 | Buchanan | 172/197 |
| 4,915,577 | 4/1990 | Fraser | 414/476 |
| 4,934,726 | 6/1990 | Daenens et al. | 280/408 |
| 4,941,671 | 7/1990 | Ellingsen | 280/91 |
| 4,946,182 | 8/1990 | Weber | 414/563 |
| 4,995,664 | 2/1991 | Buday | 296/165 |
| 5,020,603 | 6/1991 | Harrell | 172/131 |
| 5,024,456 | 6/1991 | Hadley et al. | 280/412 |
| 5,025,616 | 6/1991 | Moss | 56/14.9 |
| 5,044,858 | 9/1991 | Scott et al. | 414/687 |
| 5,090,719 | 2/1992 | Hanaoka | 280/408 |
| 5,139,103 | 8/1992 | Ducote | 180/24.01 |
| 5,245,769 | 9/1993 | Wammock | 37/357 |
| 5,246,077 | 9/1993 | Tjaden et al. | 172/450 |
| 5,332,248 | 7/1994 | Higginbotham | 414/563 |
| 5,335,739 | 8/1994 | Pieterse et al. | 180/900 |

*Primary Examiner*—Kevin T. Hurley
*Attorney, Agent, or Firm*—Edward W. Porter

[57] ABSTRACT

A tractor and a trailer are designed for operation in tight spaces, The tractor's wheels can each be powered and steered under user control. Preferably the frame is less than nine by nine feet, can support at least ten thousand pounds, can change direction in place, and can be operated by remote control. In some embodiments the trailer's hitch connector is a fifth wheel. In others it is mounted at the end of a powered, telescoping, horizontally swinging arm. The tractor can include connections for supplying hydraulic or electric power to one or more external devices, such as ones which can be mounted on the end of its rotable arm, instead of the hitch connector. The arm can have a double-jointed, hydraulically powered extension for extra flexibility. The tractor's engine can be non-polluting so it can be used inside. The wheel of the trailer can each be powered and steered, so the tractor-trailer combination is highly maneuverable. The trailer can receive power for its wheels from the tractor. The trailer can be a boat trailer having powered arms for supporting a boat hull. The boat trailer can be one which has no fixed cross members in its rear portion, so it can back around the keel of a boat. The trailer can have a retractable wheel to support its front when it is disconnected from the tractor.

30 Claims, 17 Drawing Sheets

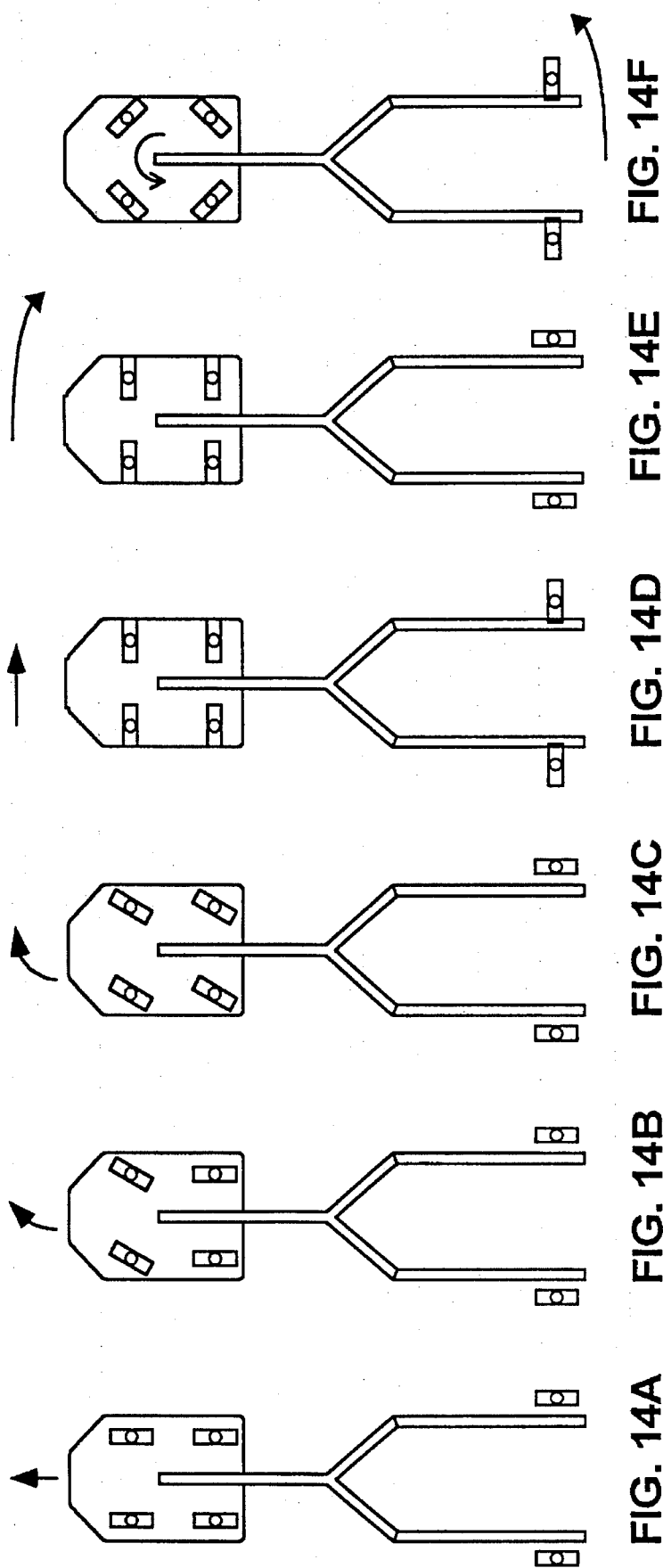

TRACTOR AND TRAILER FOR MOVING LOADS IN CONFINED SPACES

FIELD OF THE INVENTION

The invention relates to a tractor, and to a trailer, for pulling and carrying cargo, machinery, tools and power sources, and in particular it relates to such a tractor and such a trailer which can maneuver in tight spaces or unusual terrain.

BACKGROUND OF THE INVENTION

Tractors, and trailers designed to be pulled by them, have been in use almost as long as automotive vehicles. They are used to move many different types of loads, including cargoes, machinery, tools, and devices for supplying electric, pneumatic, or hydraulic power. Although tractors are often used to pull wheeled trailers, sometimes they drag or directly carry tools or loads.

One of the problems with many tractors and trailers is the amount of space they take to operate and turn. This can be of concern in any situation in which lack of maneuvering space is an issue, as it can be on factory floors, in warehouses, at construction sites, in truck yards, or in boat yards, just to name a few.

In shipyards, for example, it is often desirable to store ships, such as pleasure boats and yachts which have been taken out of the water, as close together as possible. This is because the waterfront real estate on which many boat yards and marinas are located is expensive. But most vehicles capable of pulling boat trailers, such as pickup trucks or truck tractor are highway vehicles which are normally at least twelve or fifteen feet long. Not only are such vehicles relatively large, which makes it difficult for them to fit into narrow spaces, but also they cannot turn sharply, further increasing the amount of space they require in which to operate. Most boat trailers are also difficult to maneuver, further decreasing the number of boats which can be stored in a given amount of real estate.

It is common for tractors used with boat trailers to help launch and retrieve boats by backing the boat trailers down a launching ramp which descends to, and below, the water level. One of the problems in such launchings and retrievals is that the trailer often has to be placed sufficiently deeply in the water that its tractor must get wet, which can damage the tractor's parts.

Many devices carried or pulled by tractor's require hydraulic or electric power. For example, many boat trailers have hydraulic arms, to lift up, or let down the hull of a boat they are carrying. Usually such trailers contain their own hydraulic pump and a motor for powering it. This equipment adds to the cost of boat trailers, and it can be damaged when such trailers are placed below the water line in the launching of a boat.

It is not uncommon for boat yards and other businesses to want maneuverable tractors and trailers which can be used inside as well as outside. For example, many people in the boat industry often take boats to in-door boat shows. When this is done the boats have to be moved in crowded enclosed spaces, where normal gasoline powered tractors would create offensive pollution.

Often it is desirable to pull or carry cargoes or equipment on locations where traction is an issue. For example such cargoes or equipment often has to be transported in dirt, sand, or mud. Many vehicles are not equipped for transport on such terrains.

Unfortunately tractors, particularly ones designed for pushing and pulling heaving loads, are relatively expensive. Therefore it is desirable increase the possible uses of such vehicles to better justify their worth.

SUMMARY OF THE INVENTION

It is an object of the present invention to provide tractors and trailers which address the problems described above.

It is another object of the invention to provide tractors and trailers which are compact and maneuverable so they can operate in tight spaces.

It is yet another object of the present invention to provide tractors which are capable of supporting large tongue weights from the trailers they tow.

It is still another object of the invention to provide tractors which can be operated satisfactorily indoors as well as outdoors.

It is yet another object of the present invention to provide tractors and trailers which are useful in launching, retrieving, and storing boats.

It is still another object of the invention to provide a trailer which is extremely maneuverable when used with the tractor of the present invention.

It is yet another object of the present invention to provide a trailer which is relatively inexpensive given its functionality.

It is still another object of the invention to provide a tractor for pulling, carrying, or positioning cargoes, equipment, or tools, which is maneuverable and which can operate on many different types of terrain.

One aspect of the invention relates to a tractor which has a frame, and at least three wheels mounted to support the frame. A propulsion system supplies rotational power to each wheel, and a steering mechanism turns each wheel. Speed and steering control devices enable a user to control the speed and steering of the wheels. The tractor often contains a hitch connector for selectively hitching to a trailer. Preferably both the width and length of the frame are less than nine feet, so the tractor can fit in places in which most trucks or cars cannot. It is preferred that the tractor have four wheels, and that all of them be powered and capable of turning over a large angle. This enables the tractor to change direction without substantial overall motion, such as by rotation or crab steering. It is also preferred that the tractor includes a remote control device, to enable a user to control its speed and steering without being on the tractor. This lets some embodiments of the tractor be smaller, since it does away with the need for a driver's seat and control console. It also lets the user walk around the tractor and whatever it is towing to best see how to maneuver them when in a tight space.

In many embodiments the wheels, mountings, frame, and hitch connector are made of such rugged construction that at least ten thousand pounds of tongue weight can be supported by the hitch connection. In some embodiments the hitch connector is a fifth wheel, which is mounted near the middle of the tractor's frame to best distribute the tongue weight placed upon it.

In other embodiments the hitch connector is mounted at the end of a powered, horizontally swinging arm. The swinging arm increases the ability of the tractor to maneuver trailers. Preferably the arm is rotably mounted near the center of the frame, so its arc of rotation is roughly equidistant from the sides of the tractor, reducing the additional space required for the trailers operation. In some embodiments this arm telescopes as well as swings. In others it has a double-jointed, hydraulically powered extension for extra flexibility. It is preferred that a plurality of devices, such a rakes and plow blades, can be connected to the hitch arm, so the tractor can be used for purposes other than pulling trailers.

In some embodiments the tractor include a winch mounted on the frame. This enables the tractor to be used with boat trailers which can be unhitched from the tractor and separately lowered below the water line of a boat ramp. In many embodiments the tractor is hydraulically powered. In some such embodiments the tractor includes one or more connections for supplying hydraulic or electric power to an external device. In some such embodiments the connection is in the form of a hydraulic hose wound on a motorized reel, so the tractor can power a trailer's hydraulics, even when that trailer is unhitched from the tractor.

Preferably the tractor's engine can burn propane gas, enabling it to be safely used inside without creating any significant pollution.

According to another aspect of the invention a trailer is provided. This trailer has a frame, at least two wheels mounted to support the frame, a hitch connector for hitching to a tow vehicle, and propulsion and steering systems for each road wheel. Preferably power and steering can be supplied to the trailer's wheels as a function of that supplied to the wheels of its tow vehicle, so the tractor and trailer can be steered as one unit, greatly increasing their combined maneuverability.

In a preferred embodiment the propulsion system includes hydraulic motors attached to the trailer's wheels and the trailer includes hydraulic lines for receiving and returning hydraulic power from the tow vehicle to those motors. In some embodiments the trailer is a boat trailer, including surfaces for supporting the hull of a boat, such as ones mounted on pneumatically powered arms. In some embodiments the boat trailer has no fixed members connecting its two sides for the rear one-half of its length. This enables the two sides of the trailer to be backed around a boat and the supports which are holding it on dry land. In preferred embodiments, the trailer has one or more retractable wheels near its front which can be lowered to the ground when the trailer is disconnected from its tow vehicles. This allows the trailer to be separately rolled down a launching ramp into the water, as is often required to launch or retrieve a boat, without requiring the tractor to get wet.

BRIEF DESCRIPTION OF THE DRAWINGS

These and other aspects of the present invention will become more evident upon reading the following description of the preferred embodiment in conjunction with the accompanying drawings, in which:

FIGS. 14A–14F are schematic representations of some of the different steering modes of the tractor-trailer combinations shown in FIGS. 7 and the 12;

DETAILED DESCRIPTION OF THE INVENTION

Figure 1:
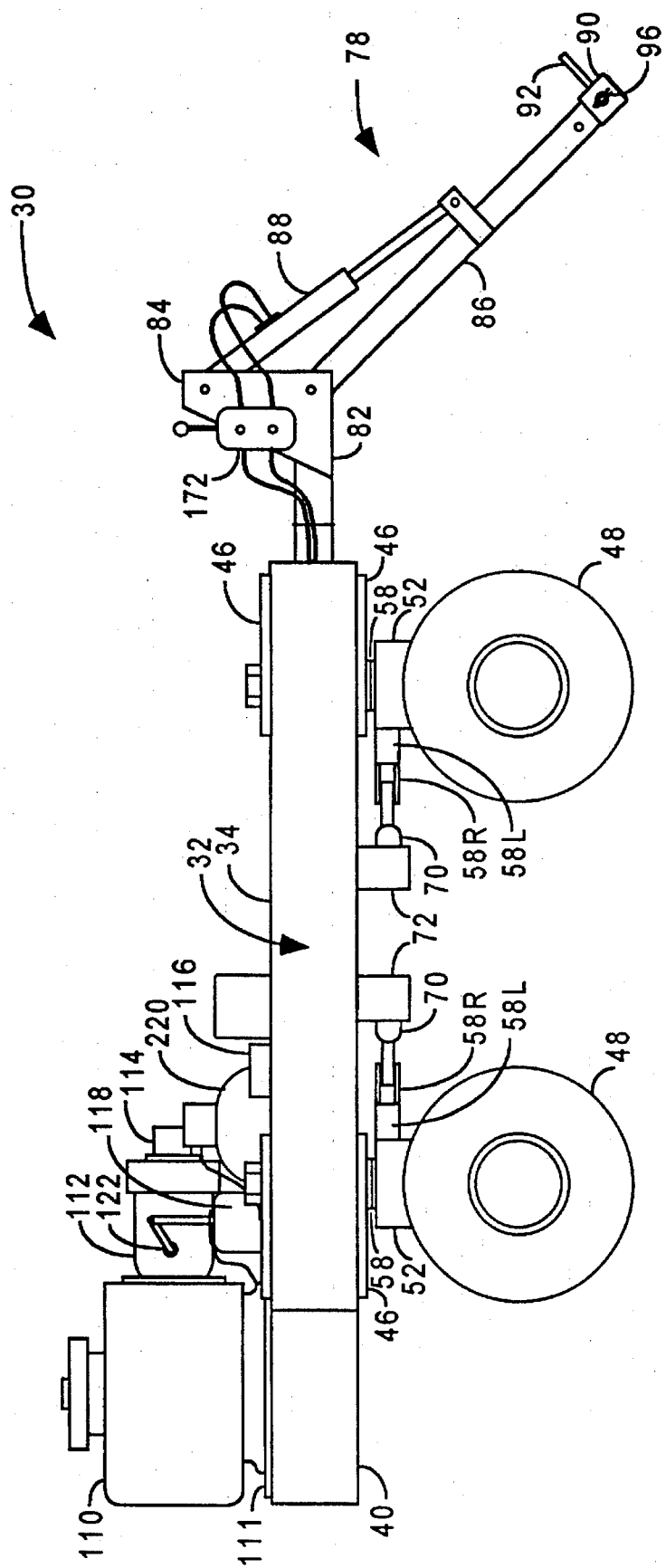
FIG. 1 is a side view of tractor embodying the present invention.
Figure 2:
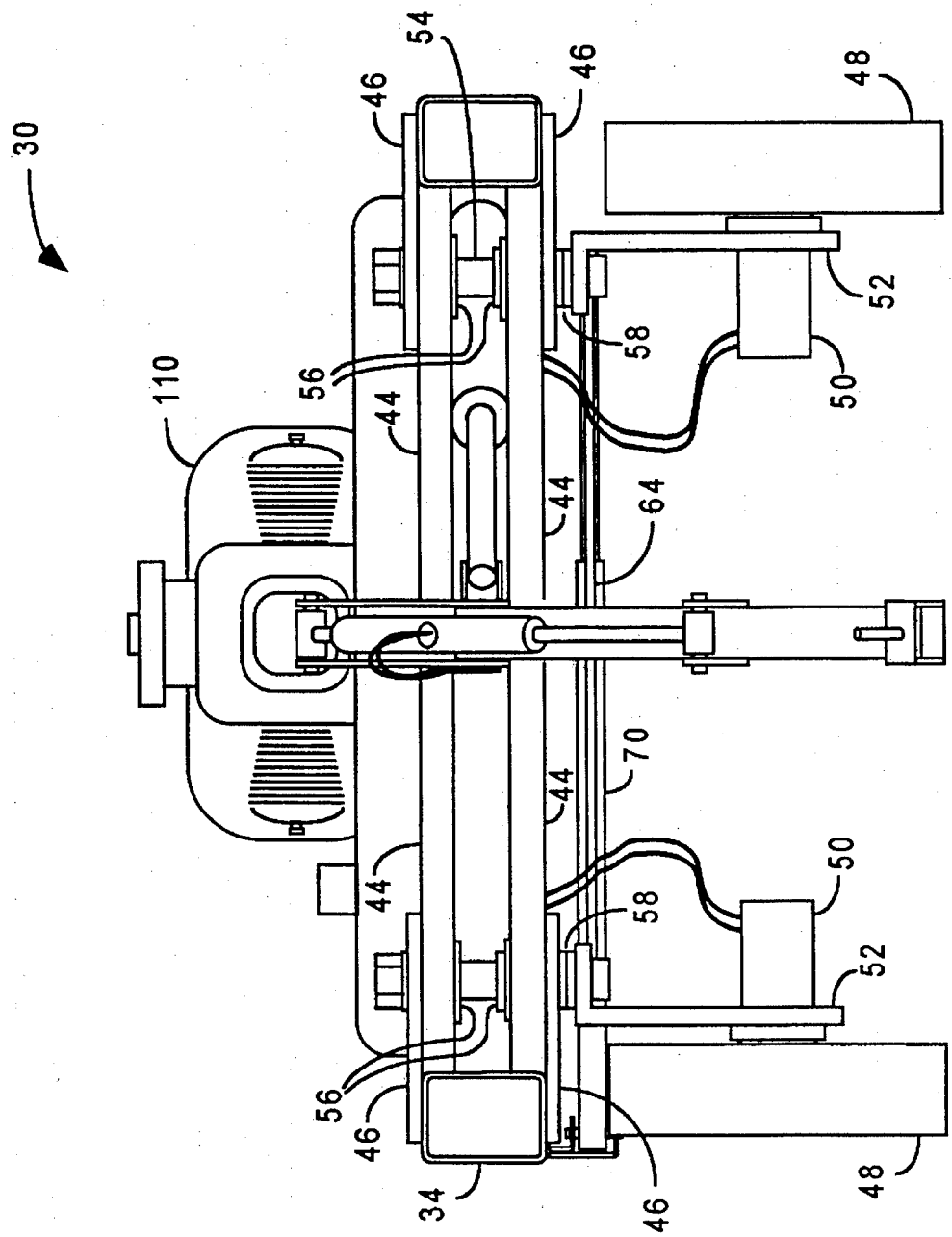
FIG. 2 is a rear view of the tractor of FIG. 1.
Figure 3:
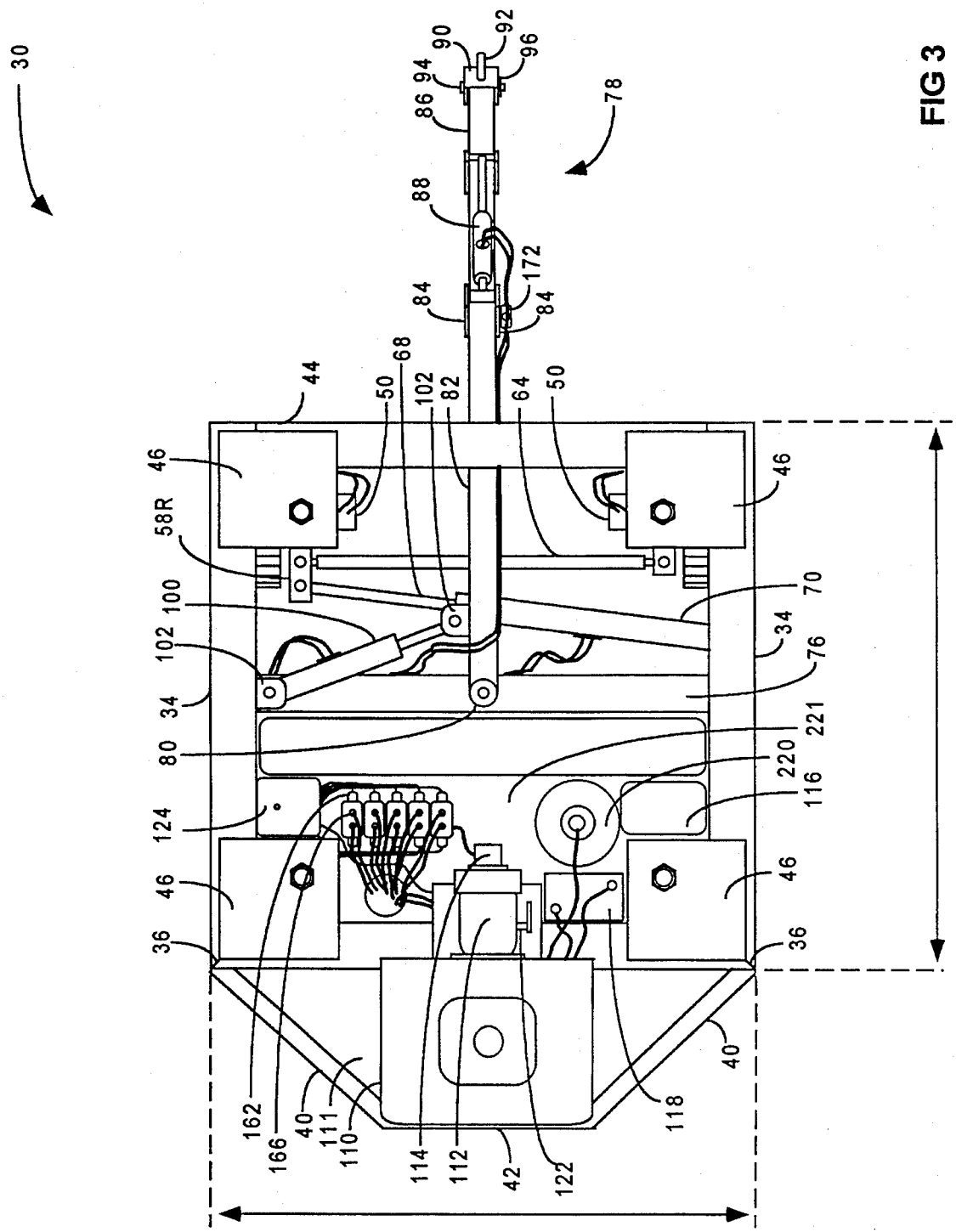
FIG. 3 is a top view of the tractor of FIG. 1.
Figure 4:
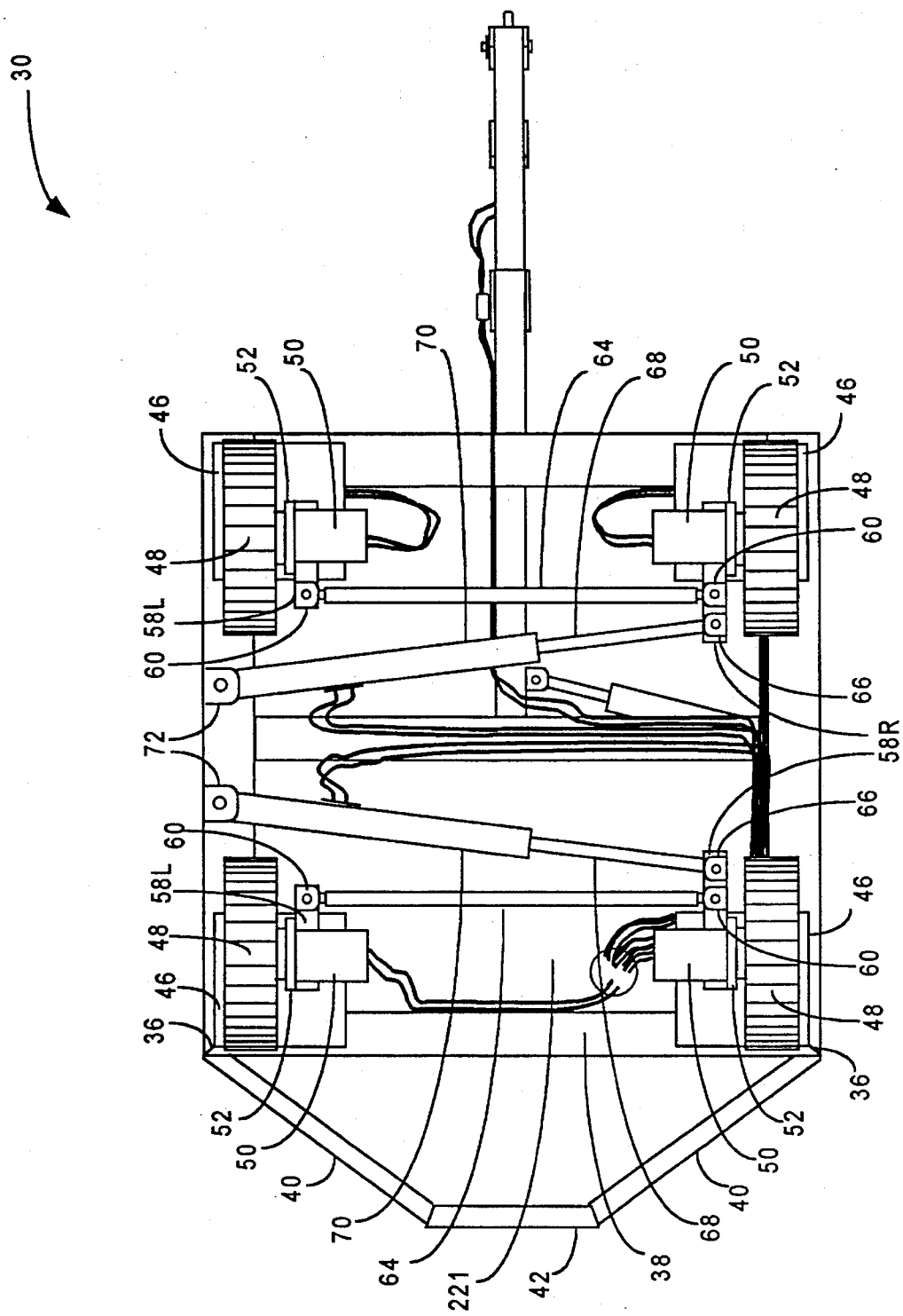
FIG. 4 is a bottom view of the tractor of FIG. 1.

FIGS. 1,2,3, and 4 are side, rear, top, and bottom views, respectively, of a tractor 30 which embodies the present invention.

The tractor 30 is made of sufficiently heavy duty construction that it can support weights of up to twenty-thousand pounds. It has a frame 32 which includes two five-by-seven inch rectangular steel tubes 34, made of one quarter inch thick steel, which form the sides of the frame. Each of these side tubes is five feet long. As can best be seen in FIG. 4, these tubes are miter welded at the welds 36 to a five foot cross tube 38, also made of similar five-by-seven rectangular steel tubing.

The frame is extended forward of the cross tube 38, by two diagonal pieces 40 and one front piece 42 between them, all of which are made of two-by-seven inch steel tubing. These pieces 40 and 42 are welded together and to the cross tube 38.

At the rear of the frame, two two-by-four inch steel rear cross bars 44 are welded between the two side tubes 34. The bottom of one of these bars is even with the bottom of the two side tubes. The top of the other is even with the top of the side tubes.

Each of the corners formed by the side tubes 34 with the cross tube 38 and the rear cross bars 44 has a one inch thick steel corner plate 46 welded to its top and bottom surface.

The tractor 30 includes four heavy duty industrial wheels 48, each eighteen and one half inches high. Each of these wheels is mounted on the rotating shaft of a hydraulic motor 50. Each of these motor's is mounted on the long, vertical leg of an L-shaped wheel strut 52, which is formed of one inch thick steel. As can best be seen in FIG. 2, an approximately two inch thick steel turning shaft 54 is attached to the top of the short, horizontal leg of each L-shaped strut. Each such turning shaft is rotably mounted near both its ends in two heavy duty ball bearing mountings 56, one on each of the two one inch thick corner plates 46 located in that shaft's corner. A heavy-duty thrust bearing 58, which includes ball beatings, is mounted on the turning shaft between the top of the L-shaped strut 52 and the bottom of the bottom corner plate 46.

The horizontal leg of each L-shaped struts includes a steering extension which extends horizontally toward the mid-section of the tractor's frame. The two L-shaped struts 52 on the left side of the tractor each have a left steering extension 58L, and the two on the fight each have a longer right steering extension 58R.

Each of the two right steering extensions 58R contains a bracket 66 for supporting a vertical pin to which the piston shaft 68 of an associated hydraulic steering cylinder 70 is rotably attached. The opposite end of each of these two hydraulic steering cylinders 70 is rotably attached to a bracket 72 which extends down from the underside of the left side tube 34. The extension and retraction of each such steering cylinder pushes its connected steering extension 58R right and left, respectively. Thus, the front steering cylinder 70 turns the front right wheel, and the rear steering cylinder 70 turns the rear fight wheel.

Both the right and left steering extensions 58R and 58L, respectively, each contain a bracket 60 supporting a vertical pin. A tie rod 64 connects the steering extensions 58L and 58R of the two front wheels, and a separate tie rod 64 connects steering extensions of the rear two wheels, so that the wheels in each pair turn together.

A two-by-six inch central cross bar 76 made of steel is welded between the central portions of the two side tubes 34. Its bottom surface is even with the bottom surfaces of the side tubes. A hitch arm 78 has one end mounted on a rotably mounting 80, which is located on the middle of the upper surface of the central cross bar. The hitch arm includes an initial length 82, made of three-by-three inch square steel tubing, which extends from the rotable mounting 80 to a pair of bracket plates 84, which are welded to the sides of its opposite end.

A liftable extension 86, and a hydraulic lift cylinder 88 for lifting and lowering that extension, are rotably mounted on pins held between the two bracket plates 84. A removable hitch connector 90, having a vertical pin 92 for engaging the circular pintle at the end of a boat trailer, is fixed to the end of the hitch arm extension with a bolt 94 and Cotter pin 96, respectively. The liftable extension can lift the hitch connector 90 up to engage and lift the pintle of a trailer, so the trailer's frame is approximately horizontal for towing. It can lift the pintie up further when a boat is being launched to help slide the boat off the trailer. It can be lowered when the hitch connector is to be removed from the pintle of the trailer.

The hitch arm's initial length 82 extends out between the tractor's top and bottom rear cross bars 44. The tubing of the arm's initial length fits snugly, but slidably, in the horizontal gap between these two rear cross bars. The bottom rear cross bar supports the hitch arm, so it can support large weights.

A hitch-arm hydraulic cylinder 100 is connected between a bracket 102 mounted on the left side of the hitch arm and a bracket 104 mounted on the inside of the tractor frame's fight side tube 34. When this cylinder is extended, the hitch arm is powered toward the tractor's left. When it is retracted, the arm is powered toward the fight. The length and placement of the hitch-arm cylinder, its attachments to the side tube and the arm, and the location of the arm's rotable mounting relative to the horizontal gap between the rear cross bars all should be designed to allow the hitch arm to rotate over at least sixty degrees so it can move substantially without the need to move the tractor. In the tractor 30 shown in FIGS. 1–4 the arm can rotate approximately eighty degrees.

The tractor 30 includes an engine 110, mounted on a flat metal surface 111 welded to the top of the tractor frame's cross tube 38, its two diagonal pieces 40, and its front piece 42. This engine powers the tractor's two major hydraulic pumps 112 and 114, and charges its electric battery 116. The engine is mounted out over the front extension of the tractor to provide a counter-weight to weight which might be applied to the hitch arm when it is carrying a load. If particularly heavy tongue weights are to be supported by the hitch arm, additional counter-weights can be placed below the metal surface 111 in the tractor's front extensions.

The engine 110 is one than can burn either gasoline or propane. The tractor includes both a gasoline tank 118 and a propane tank 220 so the switch between fuels can be made easily. Both tanks are mounted on a bottom pan 221 which is welded to the bottom front half the tractor's frame. The ability to use either fuel is advantageous, since gasoline is inexpensive and easy to get, and, thus, is often a desirable fuel. But propane bums much cleaner than gasoline, enabling the tractor to be used inside for prolonged periods of time without any substantial pollution.

The hydraulic pump 112 is a variable displacement hydrostatic piston pump. It powers the hydraulic motors 50 attached to each of the tractor's four wheels. Rotating the pump's swash plate control shaft 122 varies length and phase of the motion of the pump's pistons. This varies the speed and direction at which the pump pushes hydraulic fluid, thus, controlling the speed and direction of the tractor's wheels.

The tractor's second, smaller hydraulic pump, the pump 114, is a gear pump. It provides the hydraulic power to drive the tractor's hydraulic cylinders and to provided similar hydraulic power to external devices, such as a trailer.

Figure 5:
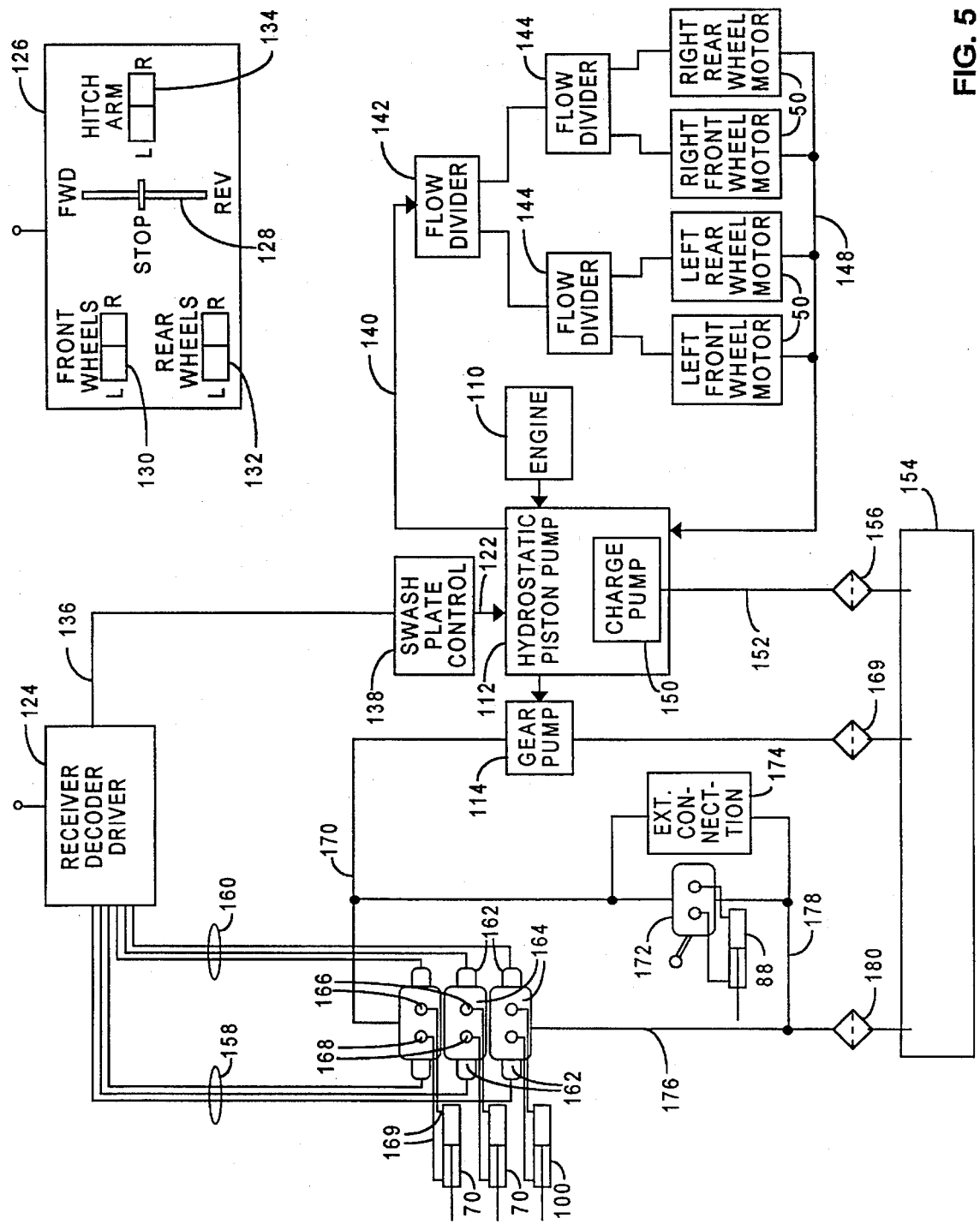
FIG. 5 is a schematic diagram of the control system of the tractor of FIG. 1.

As is indicated schematically in FIG. 5, the tractor has a radio remote control, including a receiver 124 and a transmitter 126. The transmitter includes a sliding switch 128 for controlling the speed and the direction of the tractor's wheels, and three double-throw rocker switches 130, 132, and 134 for controlling the front steering cylinder, the rear steering cylinder, and the hitch-arm-cylinder, respectively. Each rocker switch can only generate a signal having one of three values, LEFT, RIGHT, or OFF. It will only generate LEFT or RIGHT while being pushed. The sliding switch 128 can generate a signal having the value STOP or any one of a gradation of forward and reverse speed values. The transmitter 126 encodes the values produced by its four switches in a radio signal which it transmits to the receiver 124.

The receiver 124 receives this radio signal, and decodes it to determine the value generated by each of the transmitter's four switches. In response to these four values it generates corresponding control signals powerful enough to operate the tractor's electromechanical control devices.

In response the value received from the speed switch 128, the receiver generates a swash plate control signal, represented by the line 136. This signal causes an electromechanical control device 138 to rotate the pump's swash plate control shaft 122. This changes the speed or direction in which the pump 112 propels hydraulic fluid in the line 140. The flow in line 140 is split equally between the left and right wheels by a first flow divider 142, and then the flow to each side's wheels is split equally between front and back by a second level flow divider 144. An output from one of these second level flow dividers is supplied to the hydraulic motors 50 attached to each wheel. Hydraulic lines 148 return hydraulic fluid from the other side of the wheel motors to the hydrostatic pump 112.

Thus, it can be seen that the direction, either forward or reverse, and speed of the tractor's wheels is controlled by the speed control 128.

As just described, the hydrostatic pump 112 sends its fluid in a substantially closed loop which passes through the flow dividers and wheel motors. The fact that the loop is closed enables the fluid to travel in both directions, so as to propel the wheel motors in either direction. As is well known in the hydraulic arts, however, some loss of hydraulic fluid inevitably occurs in such a loop. Therefore the hydrostatic pump 112 includes, as a part of it, a small charge pump 150 which is connected by a line 152 to a hydraulic fluid reservoir 154. The charge pump pumps hydraulic fluid from the reservoir into the pump 112 and, thus, into the loop pump 112 drives, ensuring they are fully charged with fluid, as is required for proper operation. The line 152 includes a filter 156 to keep any dirt which might be in the fluid of the reservoir from entering the pump 112 or the loop it drives.

The gear pump 114, like the piston pump 112, receives rotational power from the tractor's engine 110. It uses that power to pump hydraulic fluid from the reservoir 154, through a filter 169, and into a line 170. This line is supplied to the input of a series of three solenoid-driven hydraulic switches 164. It is also supplied to a hand-operated hydraulic switch 172 used to operate the lift cylinder 88, which lifts the extension of the hitch arm. The hydraulic line 170 is also supplied to one or more hydraulic connectors 74, which can be used to supply hydraulic power to external devices, such as devices on a trailer towed by the tractor. Hydraulic lines 176 and 178 return fluid from the switches 64 and 172 and from the connection 174. This fluid is returned to the reservoir 154 through a filter 180.

Each of the three solenoid-driven hydraulic switches 164 is operated by two solenoid control lines, an extend line 158 and a retract line 160. These hydraulic switches drive the front steering cylinder 70, the rear steering cylinder 70, and the hitch-arm-cylinder 100, respectively. Each has two ports 166 and 168, each of which is connected through a line 169 to one of the two opposite sides of the piston in its associated hydraulic cylinder.

Each hydraulic switch 164 can be in one of three states. The first is an extension state. In it a signal on the switch's extend line 158 causes its solenoid to connect its ports 166 and 168, respectively, to the output of the gear pump on lines 170 and to the fluid reservoir on the return line 176. The port 166 supplies fluid under pressure to the side of the switch's associated cylinder piston which pushed that piston out from the cylinder. The port 168 receives the fluid pushed out of the other side of the piston, and passes it through line 176 toward the fluid reservoir 154.

The second hydraulic switch state is a retraction state. In it, a signal on the switch's retract line 160 connects the switch's ports 166 and 168 to the lines 176 and 170, respectively. This is just the opposite from the extension state. This cause pressured fluid to be supplied to the side of the switch's associated piston which pushes that piston inwardly, and it allows the fluid to pushed out of the other side of the cylinder.

The third switch state is the off state, in which there is no signal on either of the switch's two solenoid control lines 158 or 160. In this state both of the switch's ports are closed, locking the fluid in both sides of the switch's associated cylinder, and, thus, locking the cylinder's piston in place.

When the receiver 124 decodes a front wheel, rear wheel, or hitch arm signal from the transmitter 126 which has a value of RIGHT or LEFT, it generates a solenoid control signal which pushes the piston of the front steering, rear steering, or hitch-arm-cylinder, respectively, in the indicated direction. This rotates the front wheels, rear wheels, or hitch arm, respectively. When it decodes such signals which have an OFF value, turns off both the solenoid control lines 158 and 160 associated with the device of that signal, turning off its associated hydraulic switch and causing the hydraulic cylinder associated with that device to remain substantially locked at its current location.

Thus, it can be seen that the transmitter 126, receiver 124, solenoids 162, hydraulic switches 164, and the hydraulic cylinders 70 and 100 enable a user to selectively steer the tractor's wheels and rotate its hitch arm in response to the pushing of the rocker switches 130, 132, and 134.

By leaving the rear wheels straight ahead and by turning the from wheels the user will be able to make the tractor perform normal two-wheel steering, in which it turns in an arc. If the user turns the from and rear wheels in opposite directions, the tractor will perform four wheel steering, in which it turns in even a tighter arc. Thus, both two-wheel and four-wheel steering can be considered arc steering, since they both cause the tractor to steer in an arc.

If the user turns both the front and rear wheels in the same direction, the tractor will crab steer, that is, it will turn by moving all wheels in a new direction without having to first rotate or translate its frame. This greatly increased the ability of the tractor to maneuver in tight spaces.

The tractor 30 can turn its wheels over seventy-degrees to either the right or left. Since the wheels can be powered in either forward or reverse, the wheels have a steering range of one hundred and forty degrees in the forward direction and one hundred and forty degrees in the reverse direction. This means the tractor can crab steer in any direction from a total range of two hundred and eighty degrees. By zigzagging such crab steering, the tractor's overall course can be in any direction.

Figure 6:
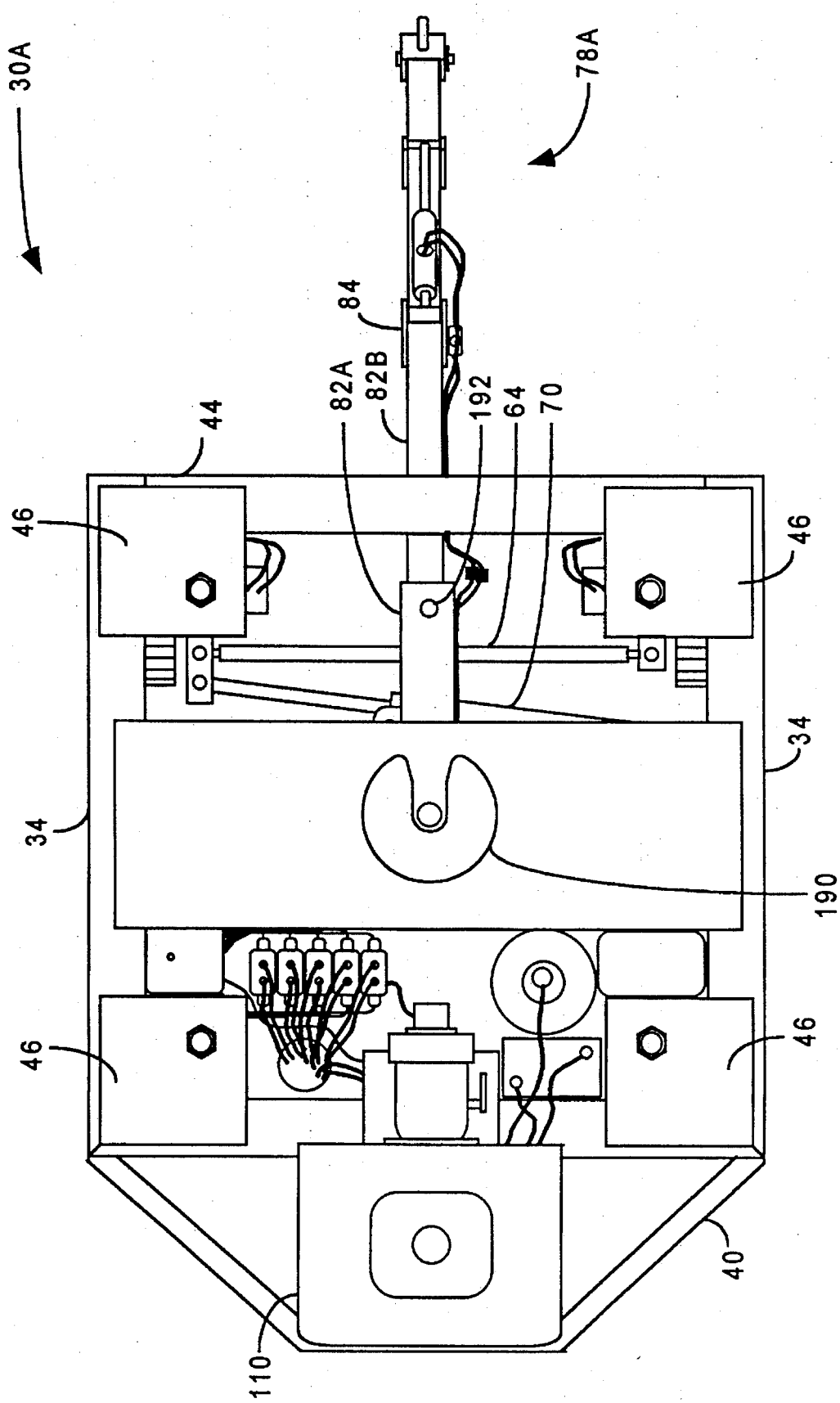
FIG. 6 is a top view of tractor similar to that of FIG. 1, except that it has a fifth wheel hitch connector mounted on it.

FIG. 6. shows an alternate embodiment of the present invention. It is a tractor 30A which is similar to the tractor 30 shown in FIGS. 1–4 except that it includes a standard truck hitching device 190, known as a fifth wheel, mounted in the center of its frame. This has the advantage of enabling almost any one of the large number of truck trailers which have a standard truck hitch to be towed by the tractor. Fifth wheels also have the advantage of being able to support a tremendous amount of weight. The placement of the fifth wheel in the center of the tractor's frame increases the amount of tongue weight the tractor can support without tilting or tipping. Such fifth wheels are often mounted on larger embodiments of the invention. They are normally mounted at the standard height for fifth wheel connectors so they can properly hitch standard truck trailers.

The tractor 30A is also different in that the initial length 82 of its hitch arm 78A has been replaced with a combination of shorter initial length 82A and a detachable portion 82B, which can be selectively fixed or unfixed relative to the initial length 82A by means of a bolt 192 and Cotter pin (not shown). This enables the tractor to have a hitch arm when desired, such as when towing trailers having a pintle hitch connector, but to remove that hitch arm when it would get in the way of a trailer connected to the tractor by the fifth wheel.

It should also be understood that in other embodiments of the invention with a fifth wheel, the hitch arm might extend out from the front of the tractor, or might not be included at all.

Figure 7:
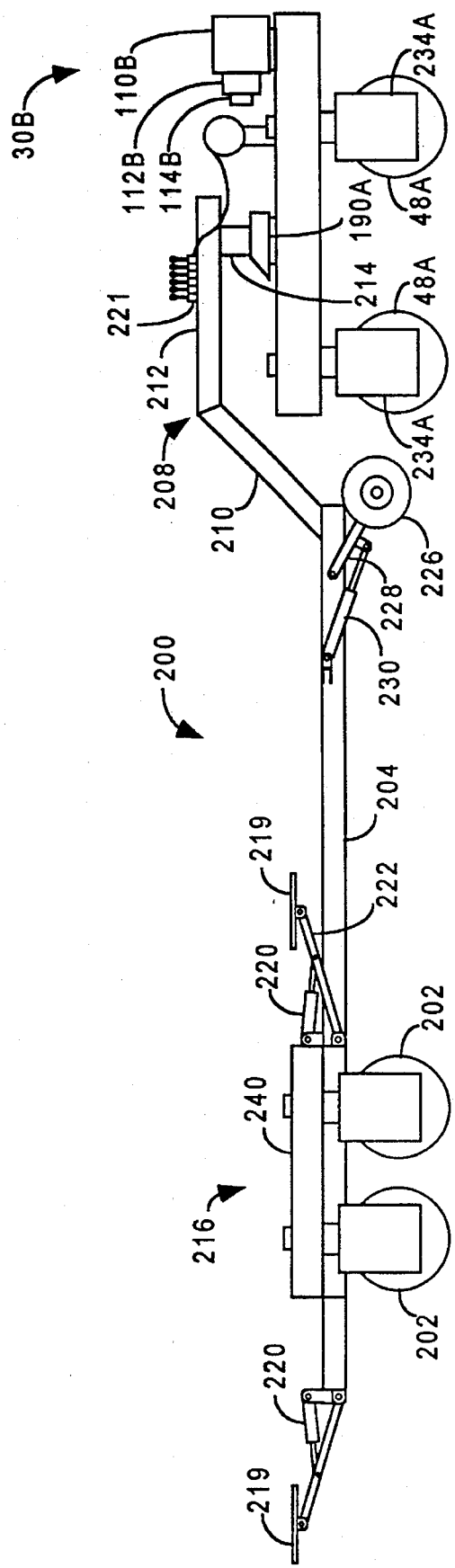
FIG. 7 is a side view of a tractor and hydraulic boat trailer both of which embody the present invention.
Figure 8:
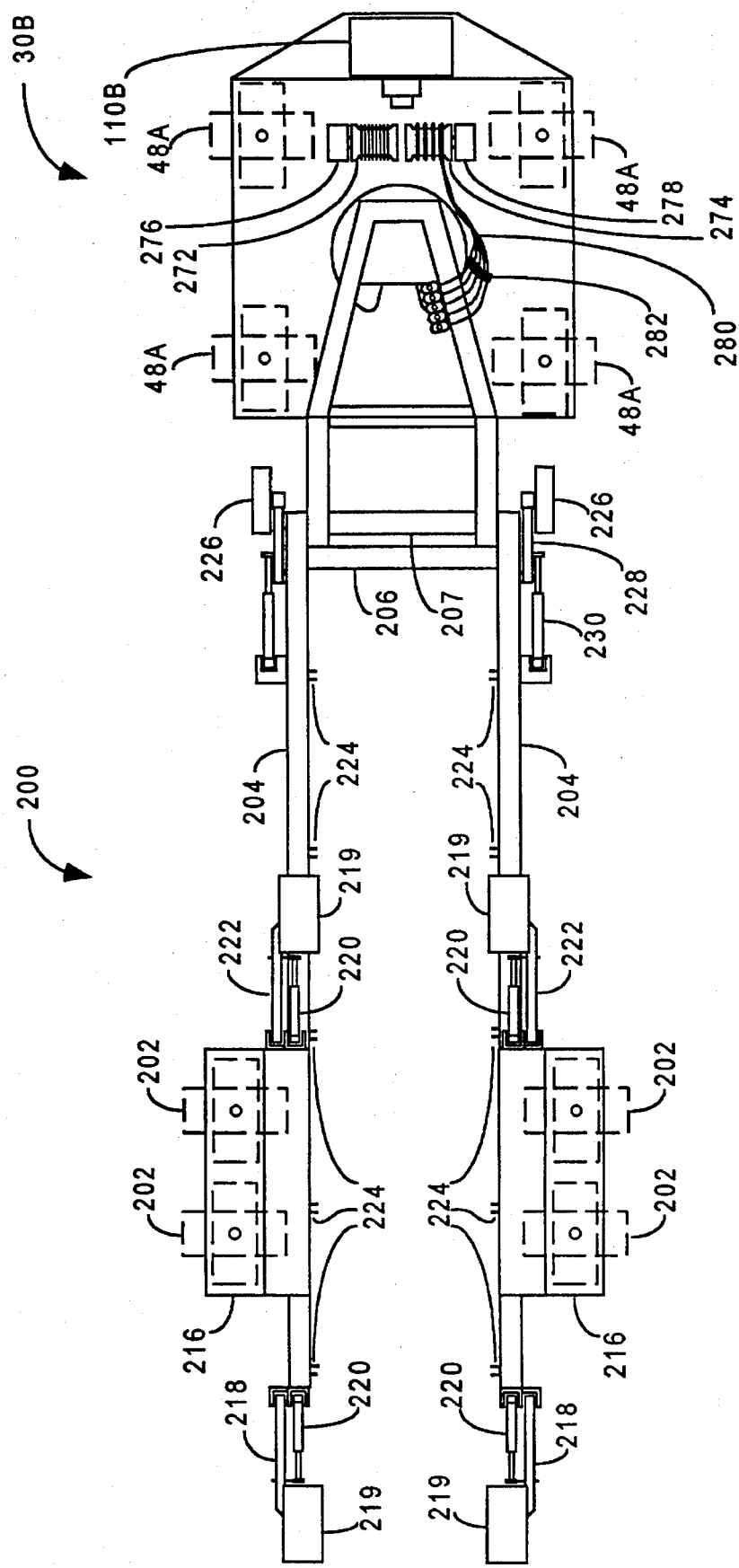
FIG. 8 is a top view of the tractor and trailer shown in FIG. 7.

FIGS. 7 and 8 are side and top views, respectively, of a tractor-trailer comprised of a tractor 30B and a hydraulic boat trailer 200.

The tractor 30B is similar in many ways to the tractor 30 shown in FIGS. 1–4. It has a heavy duty frame, a motor 110B for powering its variable speed and gear pumps 112 and 114, respectively. It has four steerable wheels, each with a hydraulic motor, and hydraulic cylinders for turning them.

But the tractor 30B differs from the tractor 30 in several important ways. It is larger and is designed to support even heavier loads. It has a fifth wheel 190A, mounted on the center of its frame, as its hitch device. Perhaps most importantly, it has a more sophisticated steering system that lets each of its wheels be turned over one hundred and eighty degrees and lets each be steered independently. This enables the tractor to change its direction to any angle, without any translational movement, by crab steering or rotation.

In addition, the wheels 202 of the trailer 200 have similar hydraulic motors and means for selectively turning them up to one hundred and eighty degrees. This enable the trailer wheels to be turned ninety degrees from straight ahead and powered while the tractor remains stationary, so as to rotate the trailer, like the hand of a gigantic clock, about the filth wheel. It also enables the wheels of the tractor and trailer to crab steer together, so the entire tractor-trailer combination can move in any direction without first having to turn.

The trailer 200 includes two long parallel side tubes 204 which are connected at their front by a cross member 206 and an end bar 207. A goose neck 208 is connected to the two side tubes 204 and the end bar 207. It has an diagonal portion 210 which extends up from the end bar at approximately forty-five degrees and a top, horizontal portion 212. The underside of the gooseneck's horizontal portion has a standard truck hitch connector 214 for connecting to the tractor's fifth wheel.

At the end of each side tube a rear hydraulic arm 218 is rotably mounted. Each of these arms extends aft from its side tube, has a hull supporting surface 219 rotably mounted on its swinging end, and has a hydraulic cylinder 220 connected to raise and lower it. The trailer has two forward hydraulic arms 222, one mounted on the outside of each side tube at the front of its wheel platform 216. Each of these arms extends forward, has a boat supporting surface 219 rotably mount at its end, and has a hydraulic cylinder 220 for lifting and lowering it. The motion of these arm can be operated from the manually controlled hydraulic switches 221 mounted on the gooseneck of the trailer.

The side tubes 204 have no fixed connection between them aft of the cross member 206, that is, for over the rear one half of the trailer's length. This enables the two side tubes of the trailer to be backed around supports which hold up the hull of a boat on land. Once this is done the trailer's front and rear hydraulic arms are raised to lift the hull of the boat off its supports. Then the trailer can drive forward.

Once this is done, removable cross beams (not shown) can be connected between the pairs of facing brackets 224 spaced along the inside walls of the side tubes 204, if desired to more securely support the keel of the boat.

A pair of small retractable wheels 226 are located near the from of the trailer's long side tubes 204. Each of these small wheels are rotably mounted near one end of a swinging strut 228. The other end of each swinging strut is pivotably mounted on one of the side tube 204. Each such swinging strut has a hydraulic wheel-lowering cylinder 230 mounted between the strut and its side tube. These cylinders can pull the swinging struts down perpendicular to the side tubes 204, so the retractable wheels can support the front of the trailer when it is not mounted on the tractor. Or the wheel-lowering cylinders can push the swinging struts up so the retractable wheels are near the bottom of the side tubes, where they will be out of the way when the trailer is being towed by the tractor.

A wheel platform 216 is located near the rear of each side tube. Each wheel platform has two steerable wheels 202 mounted under it. This platform is shown in greater detail in FIGS. 9–11.

Each trailer wheel 202 is rotably mounted on the rotating shaft of a hydraulic motor 233. The wheel is placed between the two sides of a heavy-duty, forked wheel strut 234, with the hydraulic motor fixedly attached to one side of the strut and that motor's rotating shaft 235 rotably mounted on the other side of the forked strut. A vertical steering shaft 236 is attached to the top center of each of these forked struts. This steering shaft is rotably mounted on the wheel platform 216 in a bearing 238. Its other end is rotably mounted on a top plate 240 in a bearing 242. These two bearing 238 and 242 rigidly hold the shaft in a vertical orientation. A thrust bearing 244, including ball bearings, is mounted around each steering shaft, between the top of its associated forked wheel strut 234 and the bottom of the wheel platform 216, to bear the weight which rests upon each wheel.

Each steering shaft 236 has a small gear 246 attached around it. This small gear meshes with a larger, semicircular gear 248, which rotate about a separate vertical shaft 250 extending between the wheel platform and the top plate. The large gear 248 associated with the rear-most wheel on each wheel platform, has the piston 252 of a hydraulic steering cylinder 254 rotably attached to it at one side. The opposite end of the hydraulic steering cylinder 254 is rotably mounted on a separate vertical shaft 256 which extends between the wheel platform and the top plate. The opposite side of the large semicircular gear 248 associated with the platform's rear wheel is connected by a link rod 258 to the corresponding side of the large semicircular gear associated with the platform's front wheel. This causes both semicircular gears 248, and, thus, both steering shafts 236 of each wheel platform to rotate in unison.

Because the semicircular gear 248 has a greater radius than the smaller gear 246 which it drives, a given angular displacement in the semicircular gear caused by extension or retraction of the steering cylinder causes an even greater angular displacement of the small gear and the steering shaft to which it is attached. This increase in angular displacement makes it possible for the hydraulic steering cylinder 254 to rotate the trailer's wheels through more than one hundred and eighty degrees. Since the wheels can be rotated either forward or backward by the hydraulic motors 233, this rotation of over one hundred and eighty degrees enables the trailer's wheels to propel the trailer in any direction throughout the entire range of three hundred and sixty possible degrees.

The steering shaft 236 of the rear most wheel in each of the trailer's two wheel platforms has an electronic angle indicating device 260 attached to it. Although not shown, each such device includes a disk fixedly attached to its steering shaft. This disk has electronically readable angle markings placed around its periphery. The disk is placed in a water tight casing which surrounds the steering shaft. Inside this casing is an electronic sensor which reads the angle markings on the portion of the disk which is currently aligned with it, and generates a signal based on this reading which indicates the angular displacement of the steering shaft. The angle indicating signals generated by the wheels on both sides of the trailer can be used to control the operation of the trailer's steering cylinders 254 until the trailer's wheels are set to the currently desired angle.

Figure 10:
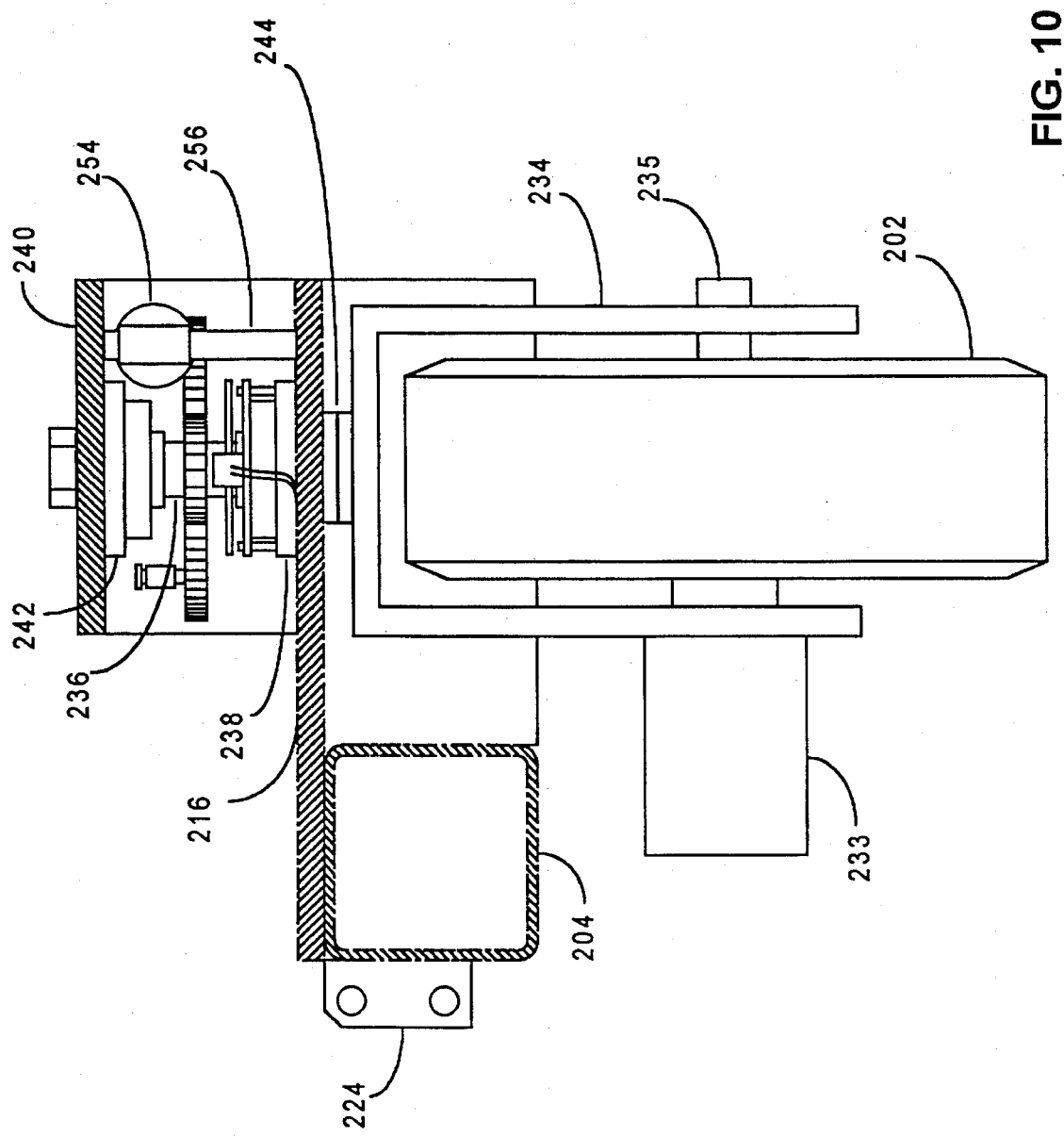
FIG. 10 is a cross sectional side view of the wheel assembly shown in FIG. 9 taken along the line 10—10 shown in FIG. 11.
Figure 11:
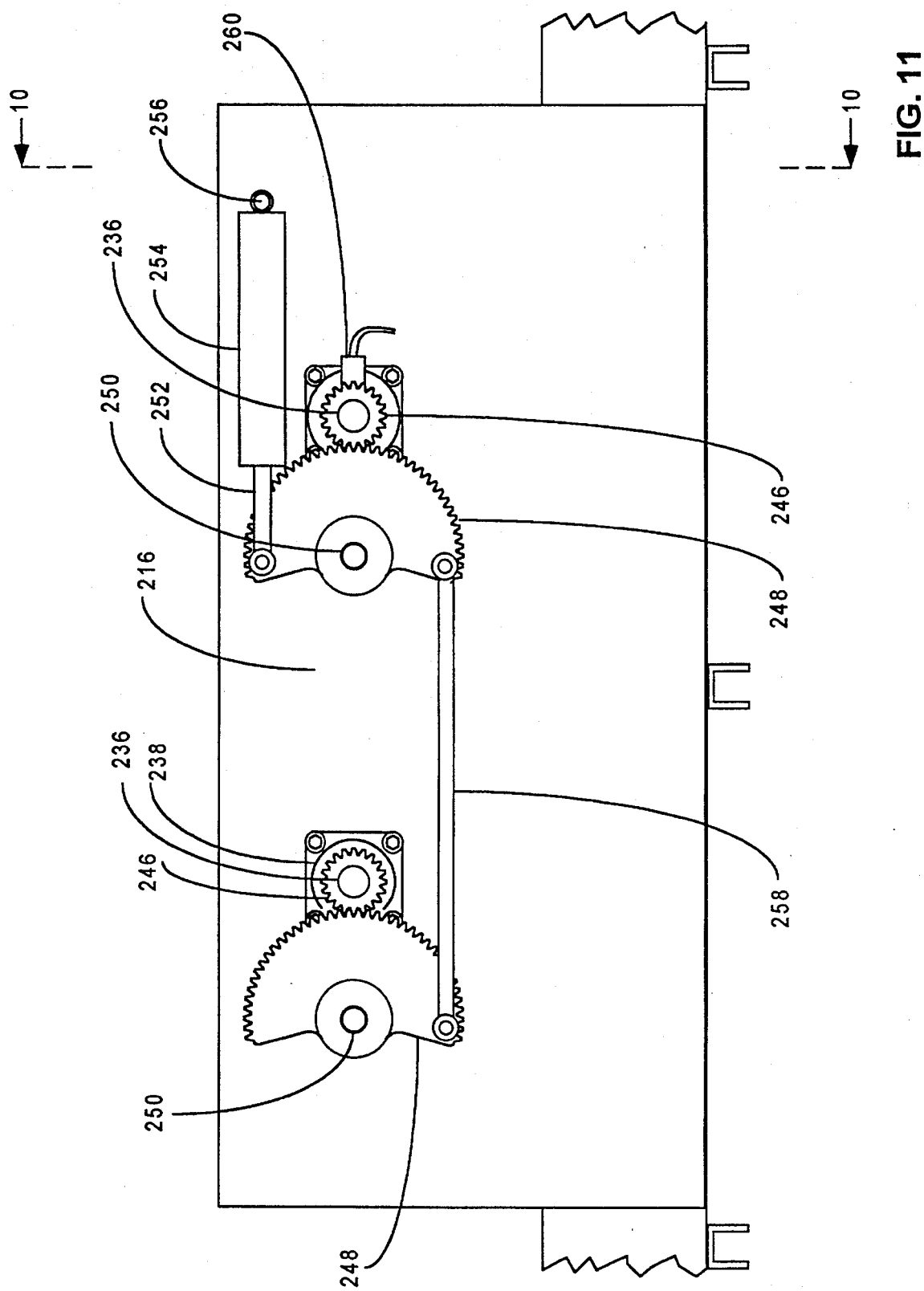
FIG. 11 is a cross sectional top view of the wheel assembly taken along the line 11—11 shown in FIG. 9.
Figure 12:
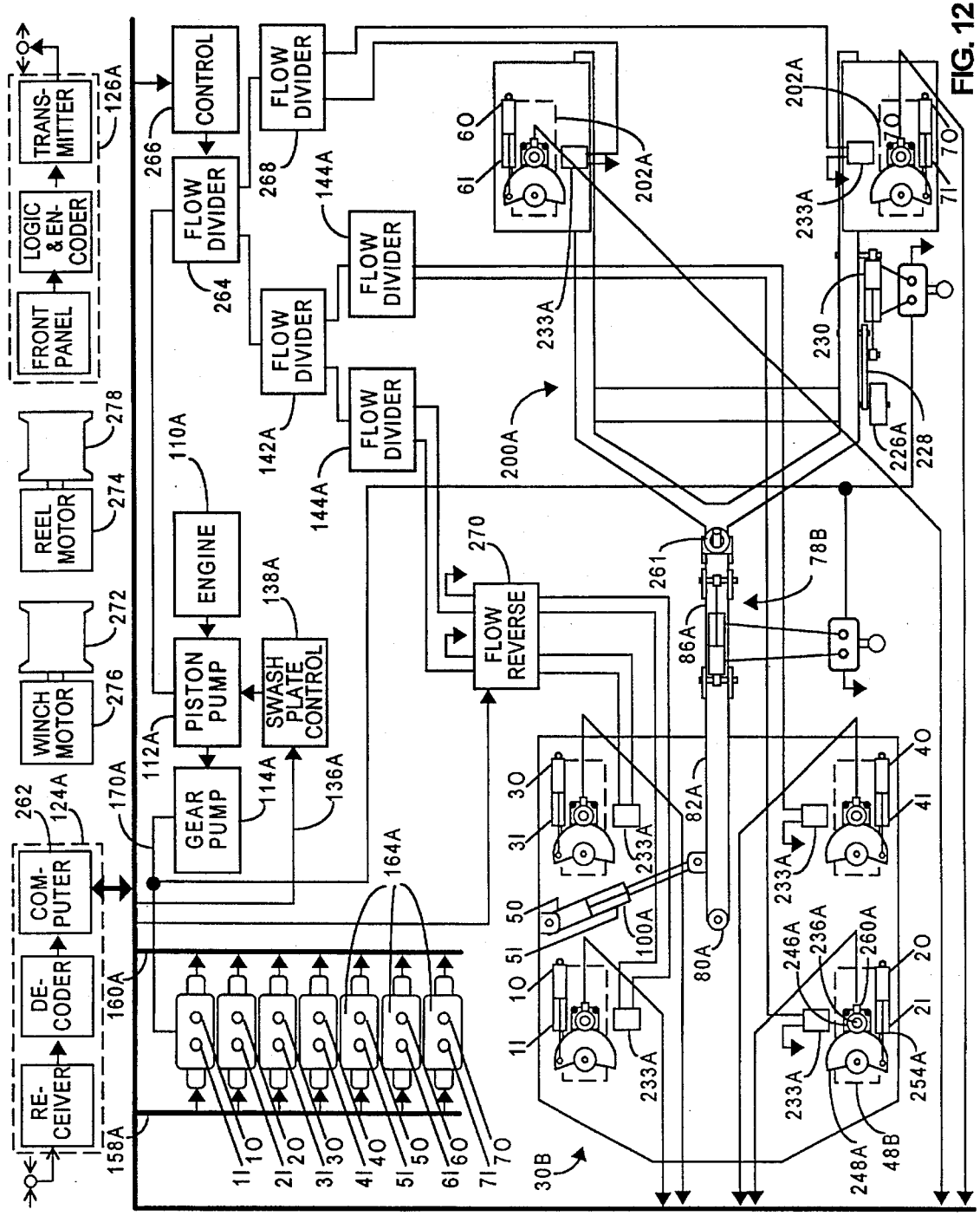
FIG. 12 is a schematic representation of tractor and boat trailer combination in which all main wheels can be turned and powered, and of the control system used to control its operation.

FIG. 12 is a schematic representation of the control system used in a tractor-trailer combination, which like that shown in FIGS. 7–11, has means for hydraulically turning and powering each of its tractor and trailer wheels in any direction, so the tractor-trailer can crab steer in any direction, or can be rotated in place with virtually no translational motion.

The tractor-trailer shown in FIG. 12 is a slightly smaller and simpler system than that shown in FIGS. 7–11. The trailer 200A of FIG. 12 has only two steerable wheels, 202A, rather than four; has only one retractable wheel, 226A, rather than two, and has a simple pintle hitch connector 261 at the front of its frame, rather than a standard truck hitch mounted on a gooseneck. The tractor 30C of FIG. 12 is very similar to the tractor 30 shown in FIGS. 1–4, and like that tractor has a hydraulically mounted hitch arm, in this case a hitch arm 78A. The major difference between the tractor 30C and the tractor 30 is its more sophisticated steering system. This steering system, like that of the tractor 30B shown in FIGS. 7–8, lets each of its tractor wheels turn over one hundred and eighty degrees, and lets each of those wheels be turned separately under computer control.

Figure 9:
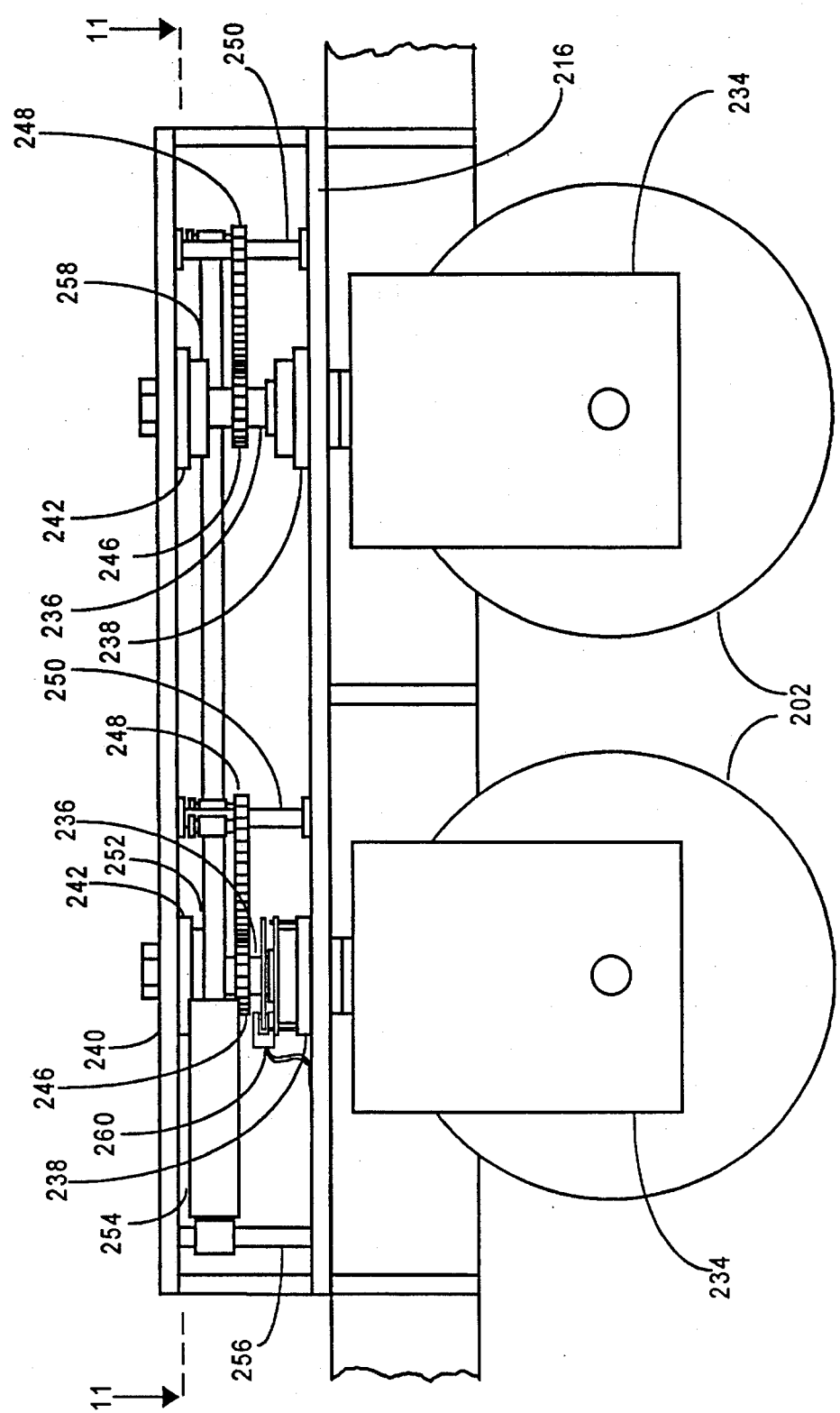
FIG. 9 is a detailed view of the wheels on one side of the trailer shown in FIG. 7 and of their mounting.

As indicated schematically in FIG. 12, each of the wheels 48B of the tractor 30C and each of the wheels 202A of the trailer 200A has a steering mechanism which operates in the same manner as that of the rear trailer wheel shown in FIGS. 9–11. Each such wheels is mounted on a forked steering strut 234A, which is turned by a steering shaft 236A. This steering shaft is turned by a small gear 246A, driven by a larger, semicircular gear 248A, which, itself, is rotated by a steering cylinder 254A. The angle of each such steering shaft is measured by an electronic angle indicating device 260A.

The motion of each wheel's steering cylinder is controlled by a computer 262, which is part of the system's remote control receiver 124A. This computer generates the solenoid control signals 158A and 160A which open and close the ports of the solenoid-controlled hydraulic switches 164A. These hydraulic switches, in turn, control the extension and retraction of the steering cylinder associated with each wheel. When the computer has an instruction that a given wheel be turned to a desired angle, it finds from the wheel's angle indicating device 260A whether the wheel is already at the desired angle or whether it is to the right or left of the desired angle. If the wheel is to the left or right of the desired angle, the computer generates the proper solenoid control signal to turn the wheel toward the desired angle, and it keeps on generating that signal until the angle indicating device indicates the wheel has reached that angle. Thus, each of the tractor's and trailer's wheels can be independently turned to any angle of over one hundred and eighty degrees under program control.

The computer 262 controls the direction and speed of the wheels of the tractor 30C and trailer 200A by sending control signals to a swash plate control device 138A, which operates in the same manner as the swash plate control device 138 described with regard to FIG. 5. The system shown in FIG. 12, however, also includes a variable flow divider 264, which is controlled by an electromechanical device 226 in response to signals from the computer 262. This flow divider provides all of the hydraulic fluid flow produced by the hydrostatic variable displacement pump 112A to the four wheel motors 233A on the tractor 30C when the trailer is not connected to the tractor. When the trailer is connected, it divides the flow between the wheel motors 233A of the tractor and trailer to achieve the desired relative speed between those wheels. Normally the tractor and trailer wheels are to be moved at the same speed, and, thus, the flow divider sends one-third of the hydrostatic pump's output to the trailer's two wheel motors and two thirds to the tractor's four wheels. The variable flow divider' output to the trailer is evenly divided between the trailer's two wheel motors by an additional flow divider 268.

The hydraulics which power the wheel motors of the tractor 30C also differs from those shown in FIG. 5 by the fact that an electromechanically operated switch 270 is provided for reversing the direction of the hydraulic power proved to the tractor's right wheel motors under computer control. As will be explained below, this enables the tractor to rotate in place.

The tractor 30B also includes a winch 272 and a hose reel 274. Each. of these is powered by a computer controlled, bi-directional winch motor 276 and 278. The winch has a cable wrapped around it which can be connected to the front of a trailer when the trailer is being used to launch or retrieve a boat on a boat ramp. When the trailer lowers its retractable wheel 226A, it can be unhitched and allowed to roll on the launching ramp. The winch cable can be released or pulled in as the trailer is either lowered or pulled up, respectively. This allows the boat trailer to go much further down the boat ramp than the tractor, enabling the trailer to be substantially submerged in the water, as is often necessary for launching boats, without getting the tractor wet. This is desirably since the tractor has more equipment which could be damaged by water such as its engine, hydraulic pumps, batteries, gas tanks, and control electronics. The relatively simple hydraulic and electric devices on the trailer, however, are designed to withstand submersion.

Wrapped around the hose reel 274 is a cable 280 which includes hydraulic power for the trailer's wheel motors, steering cylinders, wheel lowering cylinders, and hydraulic arm cylinders (which are not shown in FIG. 12). To reduce the number of separate hydraulic lines included in the cable, the solenoid controlled hydraulic switches 164A which control cylinders on the trailer are mounted on the trailer, so only one hydraulic line has to be applied to drive all of them. The cable also includes the solenoid control lines necessary to drive the hydraulic switches on the trailer and the wires necessary to power and receive signals from the angle indicating devices on each of the trailer's steering shafts. The cable 280 has a plurality of connectors 282 for connecting its hydraulic and electrical lines to corresponding lines on the trailer.

The use of the cable 280 does away with the need for the trailer to have its own hydraulic power system, saving cost. It also allows the wheels, steering, and arms of the trailer to be operated when the trailer is separated from the tractor, such as when it is substantially underwater on a launching ramp.

As has been described above, each of the road wheels of the tractor-trailer shown in FIG. 12 can be separately rotated over one hundred and eighty degrees and all the wheels can be powered in either a forward or reverse direction, all under computer control. This means the tractor can be steered in multiple different ways, including the five different ways shown in FIGS. 13A–13E.

Figure 13E:
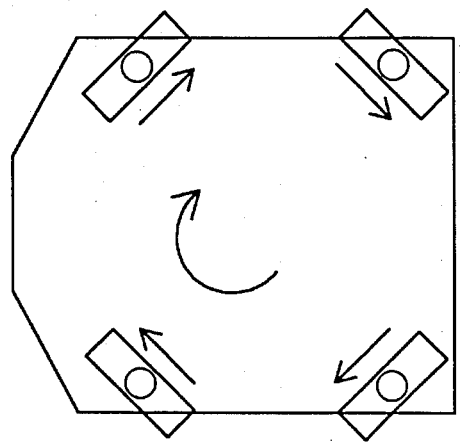
FIGS. 13A–13E are schematic representations of some of the different steering modes of the tractors shown in FIGS. 7 and 12.
Figure 13B:
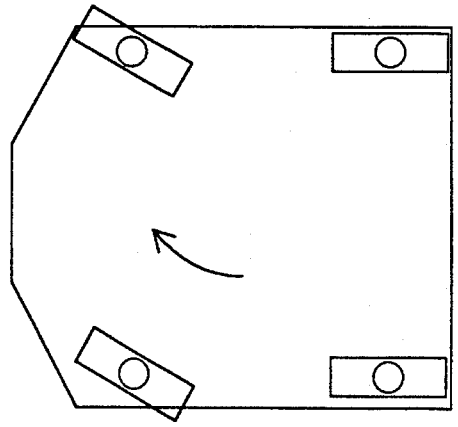
Figure 13D:
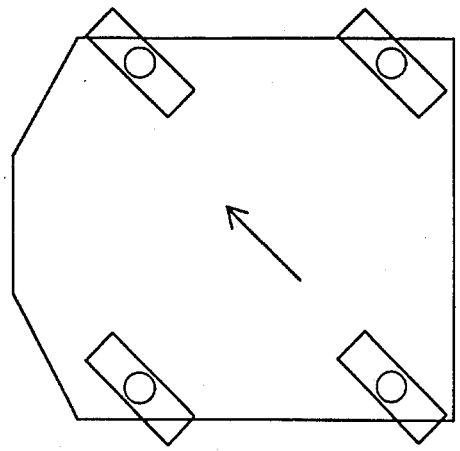
Figure 13A:
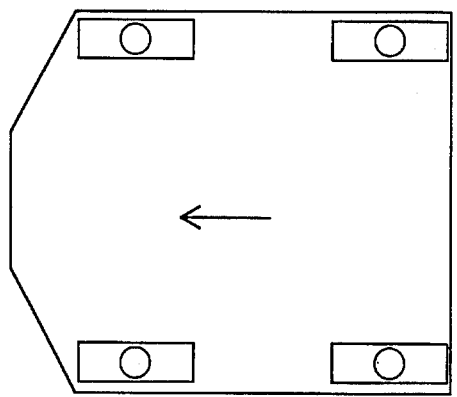

FIG. 13A shows the tractor steering straight ahead with all four wheels aligned in a forward direction.

FIG. 13B shown the tractor performing two-wheel steering with the front two wheels turned to the same angle and the rear wheels pointing straight ahead. This cause the tractor to turn in an arc.

Figure 13C:
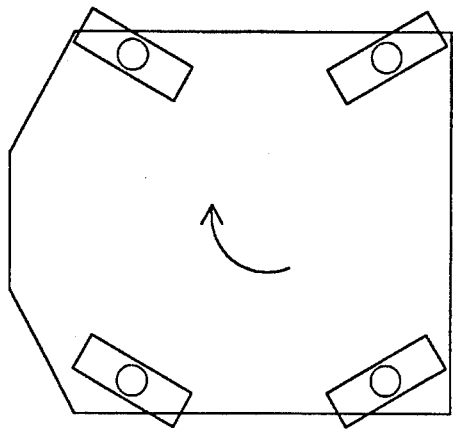

FIG. 13C shows four-wheel steering, with the from two wheels turned in one direction and the rear two wheels turned in the opposite direction. This causes the tractor to turn in an even sharper arc.

FIG. 13D shows the tractor performing crab steering, in which all four wheels are turned in the same direction. Crab steering enables the tractor to change direction without moving or turning, and thus lets it maneuver in extremely tight spaces. Since the wheels can turn over one hundred and eighty degrees, and since they can be driven either forward or reverse, such crab steering can be performed in any direction.

Finally FIG. 13E shows the tractor rotating. When this is done, the leer from and the rear right wheel are turned forty-five degrees to the right and the right from and rear left wheels are turned forty-five degrees to the left, Then, the flow reverser 270 shown in FIG. 12 causes the hydraulic power supplied to the right side of the tractor to flow in the opposite direction of that supplied to the left. This causes each wheel to rotate in the direction indicated by the arrow next to it in FIG. 13E when the hydrostatic pump 112 is pumping in the forward direction, causing the tractor to rotate clockwise. If the computer causes the hydrostatic pump to pump in the opposite direction, the tractor will rotate in the reverse, counter-clockwise direction.

The ability to steer and power the wheels of the trailer, as well as those of the tractor, makes possible a great number of possible steering modes for the tractor-trailer combination, some of which are shown in FIGS. 14A–14F.

FIG. 14A shows a straight ahead steering mode when all wheels of the tractor and trailer point forward.

FIG. 14B shows a normal two-wheel Steering mode in which all of the tractor-trailer's wheels are pointed straight ahead, except for the front two wheels which are used to turn. This enables the tractor-trailer to make arc turns.

FIG. 14C shows a steering mode in which the wheels of the tractor crab steer and the wheels of the trailer are pointed straight, enabling the tractor-trailer combination to make even sharper arc turns.

FIG. 14D shows the tractor-trailer when all of its wheels are being used to crab steer together. This allows the entire tractor-trailer to change its direction of travel to any angle with any rotation or translation.

FIG. 14E shows the wheels of the tractor turned ninety degrees to the right and the wheels of the trailer stopped. This causes the entire trailer to rotate about its rear wheels without any translational movement.

FIG. 14F shows the wheels of the trailer turned ninety degrees to the right and the tractor rotating, so the entire tractor-trailer rotates counter-clockwise about the center of the tractor.

It can be seen that the present invention provides a tractor-trailer combination which has excellent ability to maneuver.

Figure 15:
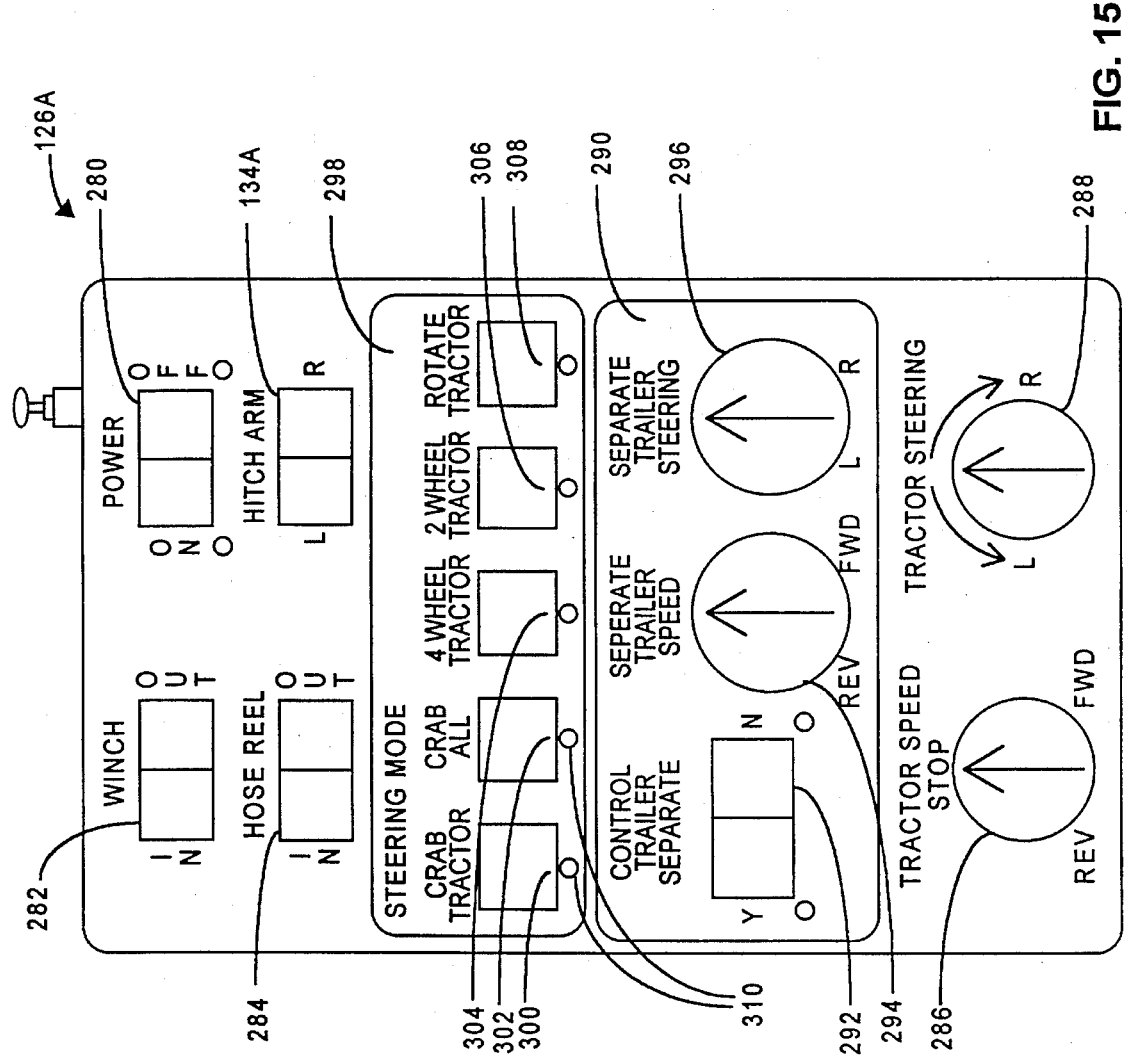
FIG. 15 is a front view of a radio remote control for controlling the tractor-trailer combination shown in FIGS. 7 and 14.

FIG. 15 shows the front of the remote control device 126A used to enable a user to conveniently control the electromechanical devices of FIG. 12, and to perform all of the steering modes shown in FIGS. 13A–13E and 14A–14F.

Near its top, the remote control includes a power switch 280, and three contact actuated double throw rocker switches 282, 284, and 134A. The switch 282 generates IN or OUT signals, when pressed to the left or fight to cause the winch motor 276 to reel the winch cable in or out, respectively. The switch 284, generates similar IN or OUT values to control the hose reel motor 274 when pressed. The LEFT or RIGHT values of the switch 134A cause the tractor's hitch arm 78A to be moved to the left or right, respectively. All of these three switches generate an OFF value, causing their associated device to remain stationary, when not pressed.

Near its bottom, the remote control also includes a tractor speed dial 286 and a tractor steering dial 288 for controlling the speed and steering of the tractor, respectively. The speed dial 286 lets the user generate any one of a plurality of speed values, ranging from fast reverse, through stop, to fast forward. The steering dial 288 lets the user indicate any angle from ninety degrees left to ninety degrees right which the wheels on the tractor are to be turned.

Near the middle of FIG. 15 are two groups of controls, the trailer controls 290 and the steering mode controls 298. The first group, the trailer controls 290, allows the user to separately control the speed and steering of the trailer's wheels, if the trailer is connected through cable 280 to the tractor's hydraulic and electronic systems. The trailer controls 290 include a control-trailer-separately rocker switch 292, which generates either a YES or a NO value. If the value is NO, the trailer wheels will be pointed straight ahead and they will be powered at a speed which substantially equals the forward or reverse component of the speed of the tractor's wheels. If the value is YES, the speed and angle of the trailer wheels are controlled by the speed dial 294 and the steering dial 296, which function similarly to the dials 286 and 288, respectively.

The steering mode controls 298 includes five push buttons 300, 302, 304, 306, and 308. The remotes control 126A, contains logic, not shown, which causes the most recently pushed of these buttons to generate an ON value, and all the others to generate OFF values. Each push button has an LED status light 310 under it to indicate which of them is currently generating an ON value.

When the crab-tractor button 300 is pushed the tractor performs crab steering, as shown in FIG. 13D, with the direction of the tractor's wheels being determined by the steering dial 288.

When the crab-all button 302 is pushed, the tractor performs similar crab steering, and, if the trailer is connected, its wheels are turned and powered in unison with those of the trailer. This causes the entire tractor-trailer to crab steer, as indicated in FIG. 14D.

When the four-wheel-tractor button 304 is pushed, the tractor performs 4 wheel steering as indicated in FIG. 13C, with the direction of the tractor's front wheels equaling that on the tractor steering dial 288, and that its rear wheels being the opposite.

When the two-wheel-tractor button 306 is pushed the tractor performs two wheel steering of the type shown in FIG. 13B, with the direction of the tractor's front wheels being controlled by the tractor steering dial 288.

Finally, when the rotated-tractor button 308 is pushed the tractor rotates as shown in FIG. 13E. The direction of rotation is controlled by the tractor speed dial 286, but the tractor steering dial 288 is ignored.

In all the modes governed by these push buttons, except the crab-all mode, if a trailer is connected, the speed and direction of its wheels is governed by the trailer controls 290. If the control-trailer-separately switch is OFF, the trailer wheels will be powered straight ahead at a speed which corresponds to the forward component of the tractor's motion. If the control-trailer-separately switch is ON, the speed and steering of the trailer's wheels is controlled by the dials 294 and 296.

Figure 16:
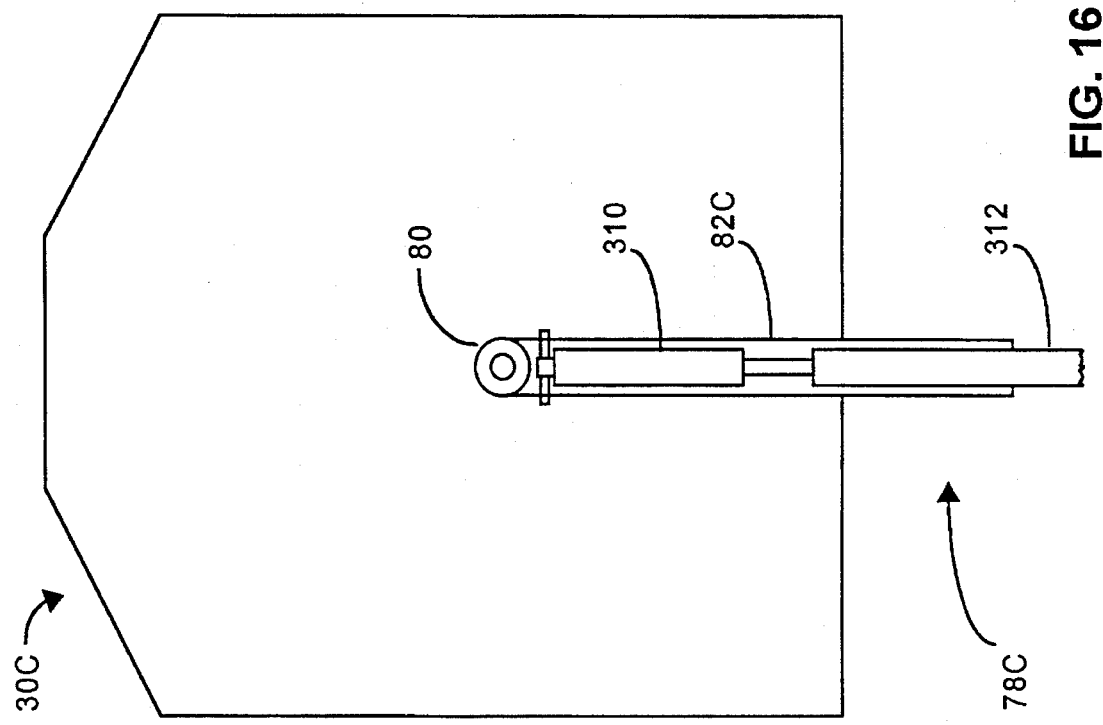
FIG. 16 is schematic diagram showing a tractor embodying the present invention which has a telescoping hitch arm.

FIG. 16 is a schematic view of another tractor 30D. This tractor is like the tractor 30 shown in FIGS. 1–4, it has a hitch arm 78C which is like the hitch arm 78 shown in FIGS. 1–4. The hitch arm 78C, however, is different because its initial length 82, which is rotably mounted at 80, has attached to it a hydraulic cylinder 310 which can slide a telescoping extension 312 of the hitch arm in and out. The extension can either have a hitch or other device mounted directly on it, or can have bracket plates 84 for mounting a hydraulically liftable extension, like the extension 86 shown in FIGS. 1–4. Such a telescoping hitch arm allows the tractor 30D greater flexibility in moving the fronts of trailers to it is attached.

Figure 17:
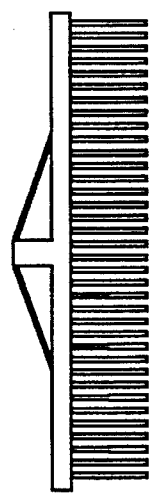
FIG. 17 show a rake attachment which can be mounted on the hitch arm of a tractor embodying the present invention
Figure 18:
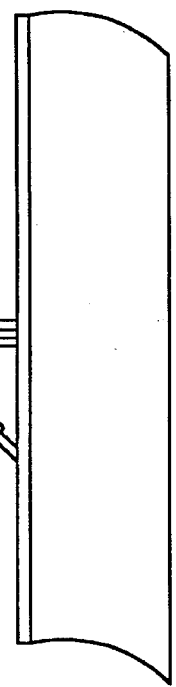
FIG. 18 shows a plow attachment which can be mounted on the hitch arm of a tractor embodying the present invention.

FIGS. 17 and 18 illustrate two of the many different types of tools which can be attached to the end of hitch arms used with the present inventions, such as the hitch arms 78, 78A, 78B, and 78C described above. As shown in FIG. 1, the hitch connector 90 at the end of the hitch arm 78 is connected with a bolt 94 and Cotter pin 96, respectively. This connector can be removed and other devices can be connected to the end of the arm, by means of a bolt and Cotter pin, in its place. FIG. 17 shows a rake which can be pulled or pushed by the tractor. FIG. 18 shows a plow blade. As those skilled in the art will understand, many other types of tools, devices, or hitch connectors could be connected to the end of such a hitch arm.

Figure 19:
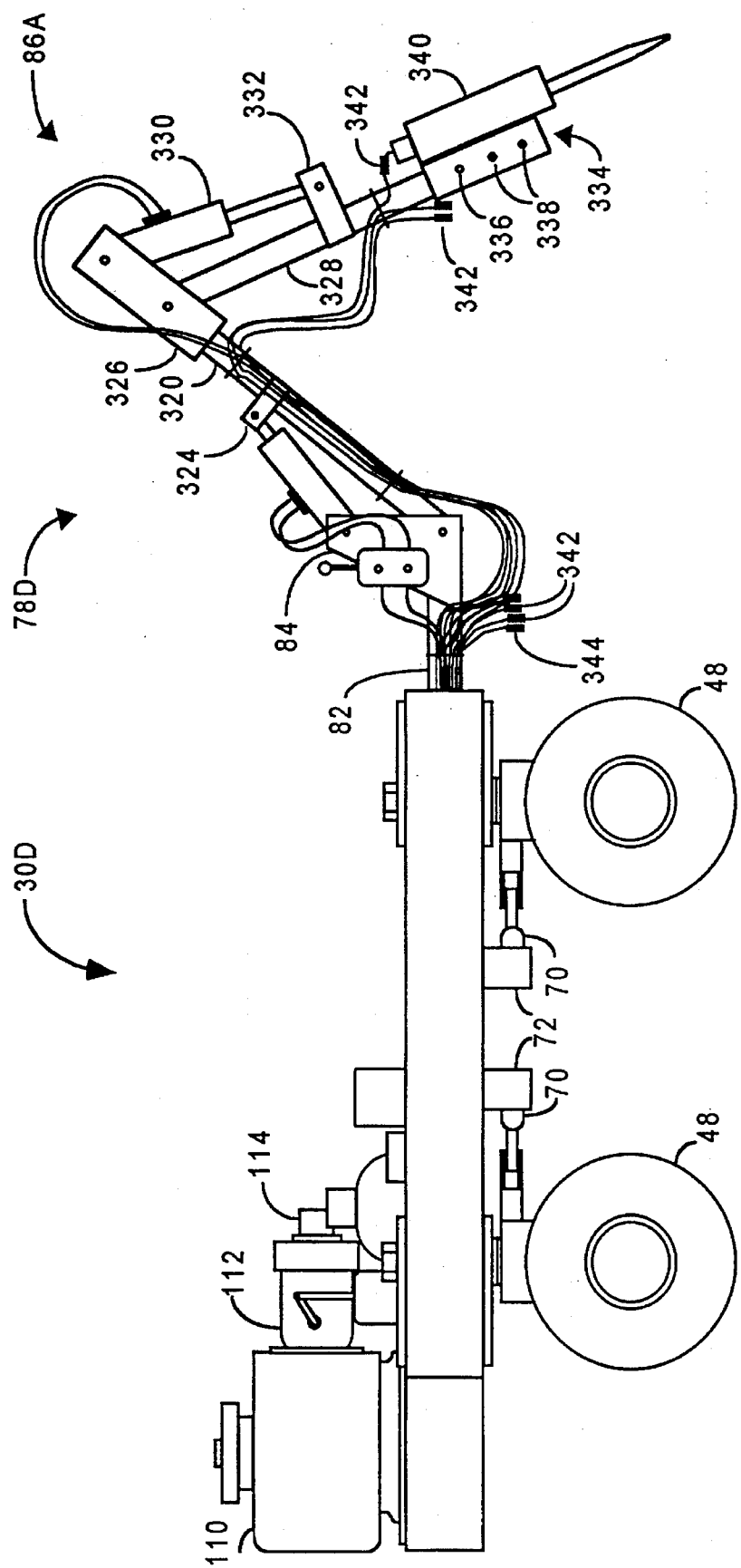
FIG. 19 is a side view of an alternate embodiment of the invention similar to that shown in FIG. 1, except that the rotable hitch arm has been replaced with a double jointed hydraulically powered arm on which a hydraulic jack hammer has been attached.

FIG. 19 shows another embodiment 30E of the inventions which is similar to that shown in FIGS. 1–4 except that the hitch arm has had the liftable extension 86 replaced with a double-jointed hydraulically powered extension 86A which has two hydraulically liftable portions 320 and 328.

The extension 86A's first liftable portion 320 has one end rotably mounted in the bracket plate 84, which is mounted on both sides of the end of the arm's original length 82. This mounting enables the first liftable portion to rotate in a vertical plane. A hydraulic cylinder 322 also has one end rotably mounted in the bracket plate 84. The end of this cylinder's piston shaft is connected to a bracket 324 mounted on the first liftable portion, so that the cylinder can lift the other end of the arm's first liftable portion.

Another bracket plate 326 is mounted at the end of the arm's first liftable portion. It has one end of the arm's second liftable portion 328 mounted in it, so the second portion can also rotate in a vertical plane. The bracket plate 326 also has one end of a hydraulic cylinder 330 rotably mounted in it. The end of this cylinder's piston shaft is rotably mounted to a bracket 332 mounted on the arm's second portion, so that the cylinder can rotate the arm's second portion relative to the end of its first portion 320.

The two joints formed by the bracket plates 84 and 326, and the two hydraulically liftable portions of the arm give the arm great flexibility of movement, allowing not only its height, but also its distance from the frame of the tractor to be varied.

The end 334 of the arm has a plurality of holes, such as the hole 336, through which bolts, such as the bolts 338, can be passed to attach various devices and tools to the end of the hitch arm 78D. In FIG. 19 a hydraulic jack hammer 340 is shown connected to the arm. A plurality of quick release hydraulic connectors, such as the connectors 342, are provided for supplying hydraulic power to whatever hydraulically powered external device is connected to the hitch arm.

The tractor also includes an electrical connector 344 for supplying electrical power from the tractor's battery to external devices. In other embodiments of the invention, a 120 Volt AC generators is mounted on the tractor and multiple electric connectors are provided for supplying AC power to such external devices.

It should be understood that the forgoing descriptions and drawings are given merely to explain and illustrate the invention and that the invention is not to be limited thereto, except in so far as the interpretation of the appended claims are so limited. Those skilled in the art who have the disclosure before them will be able to make modifications and variations therein without departing from the scope of the invention.

For example, it should be understood that tractors embodying the present invention can be used for many different purposes. Their multi-wheel power and steering makes them suitable for operation on many different types of terrain, including dirt, sand, or mud. Such tractors can be used as movable platforms for carrying and powering hydraulic tools. Such a platform could be used to move and power a jack hammer, such as the one shown in FIG. 19, at a construction site, or a drill auger in mining. It could be used to tow trailers carrying heavy loads and/or it could be provided with a platform to directly carry cargoes. Such a tractor could tow or push rakes, brooms, plows, or ditch diggers.

The tractor and trailer of the present invention can be made in different sizes, strengths, and weights. For example, lighter version of the tractor could be used for farming, gardening, and landscaping work. Such versions could transport raking, mowing, spraying, fertilizing, or pruning machinery, as well as tow cans bearing either freight or machinery. Embodiments of the invention could be used in any location in which normal farm tractors are used, but in which greater maneuverability is needed.

The invention can be used for purposes as diverse as pulling stumps, pulling up docks, moving tractor trailers in crowed truck yards, lifting containers off freight trains, etc.

It should be understood that tractors and trailers of the present invention could have more or fewer wheels than those described above. It should also be understood that the wheels of such tractors and trailers can be powered by means other than a hydraulic motor attached to each wheel. For example, an electric motor could be attached to each wheel, or a mechanical drive system could distribute power from one engine or motor to separate wheels.

The engine used to power the tractors of the present invention need not be an engine which is specifically designed to quickly switch between burning propane or gasoline. In some embodiments it could be a standard engine which only burns gasoline or some other polluting fuel. In others it could be a standard gasoline engine which as been converted to burn propane. In yet other embodiments the engine could be replaced by one or more electric motors.

Similarly the wheels of the invention could be steered by means other than those described above. For example, a tractor which was designed to only crab steer could have a single chain loop which extended around all of its steering shafts and turned them all in unison. In other embodiments electric motors could be used to steer wheel.

The embodiments of the invention described, have not been designed for extended travel on normal highways. It should be understood, however, that other embodiments of the invention could be designed for such highway travel. For example, a trailer embodying the present invention could be designed for highway travel by having a suspension system on its wheels, and by having means for locking its wheels straight ahead and placing them in neutral when traveling on the highway and for rotating and powering them when trying to carefully position the trailer off the highway.

Many types of steering and propulsion modes can be used with tractors and trailers of the present invention. For example, when making a turn the inner wheels normally travel over less ground than the outer wheels because the radius of their turn is less than that of the outer wheels. In some embodiments of the invention the propulsion system compensates for this to prevent occasional skipping of the inner wheels relative to the ground on sharp turns. Similarly when performing sharp turns it is often desirable to have the wheels on the inside of the turn at a slightly different angle than those on the outside, because they are turning at a slightly different radius. The steering systems of some embodiments, particularly ones with computer controlled steering like that described with regard to FIGS. 7–12, can compensate for this.

In other embodiments of the invention, the hitch arm is be mounted and powered so that it can rotate over a greater angle than the hitch arms shown above. For example, in some embodiments the hitch harm is mounted on top of the tractor's frame and is powered by an electric or a hydraulic motor, so it could rotate a complete three hundred and sixty degrees.

Different types of trailers can be used with the invention. The invention's tractors can be used with almost any kind of trailer. For example, as stated above, tractor's having a fifth wheel can be used to move standard truck trailers. The invention's trailers are not limited to boat trailers of the type disclosed in the drawings. A trailer which has wheels which can be powered and steered can be used in many applications besides hauling boats. As stated above, a highway trailer with such wheels would have many uses.

The invention can be used with many types of boat trailers besides those shown in FIGS. 7–12. It can be used with trailers designed for power boat as well as those designed for sail boats. It can be used for boat trailers which have fixed cross bars along their entire length as well as those shown in the figures which do not.

It should be understood that other types of control systems can be used with the present invention. For example, some embodiments of the invention might not have any remote control system at all, but instead might have a control panel and platform or seat for a person ride or sit on. In other embodiments, the tractor or trailer might have both such a control panel and a remote control device. In some embodiments the remote control device might use infrared or ultrasonic sound, rather than radio, to communicate commands. In others, a cable might be provided to relay commands between the remote control and the tractor.

The invention is not limited to the particular combination of commands or controls represented by the remote control devices described above. For example, in some embodiments of the invention, the remote and the solenoid controlled hydraulic switches might control the liftable extensions of the tractor's rotable arm. In some embodiments the remote will be able to control external devices connected to the tractor's hydraulic or electrical power connections. For example, the remote could control the hull supporting hydraulic arms on a boat trailer designed to operate with a tractor of the present invention. In some embodiments, the hull supporting arms of the trailer might be powered by air or electricity, rather than by hydraulic power.

Accordingly, the invention is not to be limited to the specific embodiments illustrated and described, and the true scope and spirit of the invention are to be determined by reference to the following claims.

What I claim is:

1. A tractor for moving truck trailers comprising:
   a horizontal frame;
   a fifth wheel hitch connector mounted on the frame at a standard height for fifth wheel hitch connectors to enable truck trailers designed to be hitched to standard height fifth wheel connectors to be hitched to the tractor;
   at least three wheels;
   a wheel mounting for each wheel, mounting each such wheel to support the frame so the mounted wheels provide a stable three, or more, point support for the frame;
   means for supplying rotational power to each wheel;
   a steering mechanism for turning each wheel;
   a speed control device for enabling the rotational power supplied to the wheels to be selectively controlled; and
   a steering control device for enabling the turning of the wheels by the steering mechanisms to be selectively controlled.

2. A tractor as in claim 1 wherein the steering mechanism and steering control device include means for enabling all of said wheels to be turned in the same direction so the tractor can change direction without substantial translational motion.

3. A tractor as in claim 1 wherein the steering mechanism includes means for turning each wheel through an angular range of at least one hundred and eighty degrees.

4. A tractor as in claim 1 wherein:
   there are four of said wheels and four of said wheel mountings and the wheel mountings mount said wheels at four locations on said frame which define the corners of a substantially rectangular shape; and
   the fifth wheel is connected to said frame near the middle of said substantially rectangular shape so the tongue weight of any trailer hitched to the fifth wheel will be spread substantially equally amoung said four wheels.

5. A tractor as in claim 1 further including:
   a hitch arm having first and second ends:
     means for mounting the hitch arm on the frame near the arm's first end so the arm's second end can rotate horizontally;
     an additional hitch connector located near the hitch arm's second end to enable a trailer to be hitched to the arm's second end and
     a mechanically powered device for selectively rotating the hitch arm relative to the frame.

6. A tractor as in claim 5 wherein the hitch arm has first and second portions which extend in a given direction, and the first portions slides relative to the second portion in the given direction so as to change the length of the arm.

7. A tractor as in claim 1 further including a remote control system which enables the speed control device and the steering control device to be remotely controlled from a location removed from the tractor.

8. A tractor as in claim 7 wherein the remote control system includes:

a remote control transmitting device, which can be removed and operated remotely from the tractor, having a transmitter for transmitting coded electromagnetic transmissions; and a receiver mounted on the tractor for receiving and decoding those transmissions.

9. A tractor as in claim 1 wherein the steering mechanism and steering control device include means for selectively enabling either all wheels to be turned in substantially the same direction for crab steering or different wheels to be turned in different directions for arc steering.

10. A tractor as in claim 1 further including a winch mounted on the frame.

11. A tractor as in claim 1 further including:

a hydraulic pump; and at least one connection for supplying hydraulic fluid under pressure to an external device.

12. A tractor as in claim 11:

wherein the at least one connection for supplying hydraulic fluid includes a sufficient length of hose to supply such fluid to a trailer which is too far away from the tractor to be connected to the hitch connector; and further including a reel for winding and unwinding that hose.

13. A tractor for moving trailers comprising:

a horizontal frame having edges which define its length and width;

an arm which has two ends, a mounted end and a swinging end:

means for mounting the arm on the frame near the arm's mounted end so the arm's swinging end can rotate horizontally, said arm having a sufficient length between said mounted end and said swinging end so that the swinging end extends out past at least one of the edges of the frame;

a mechanically powered device for selectively rotating the arm's swinging end relative to the frame:

a hitch connector mounted on the winging end of said arm to enable a trailer to be hitched to the tractor;

at least three wheels;

a wheel mounting for each wheel, mounting each such wheel to support the frame so the mounted wheels provide a stable three, or more, point support for the frame;

a propulsion system for supplying rotational power to each wheel;

a steering mechanism for turning each wheel;

a speed control device for enabling the rotational power supplied to the wheels to be selectively controlled; and a steering control device for enabling the turning of the wheels by the steering mechanisms to be selectively controlled.

14. A tractor as in claim 13, wherein the arm includes a mechanically powered device for selectively lifting and lowering the swinging end of the arm.

15. A tractor as in claim 13, wherein there are four of said wheels and four of said wheel mountings and said wheel mountings mount said wheels at four locations on said frame which define the corners of a substantially rectangular shape and the mounted end of the arm is rotably mounted near the center of said substantially rectangular shape.

16. A tractor as in claim 13, wherein the steering mechanism and steering control device include means for selectively enabling either all wheels to be turned in substantially the same direction for crab steering or different wheels to be turned in different directions for arc steering.

17. A tractor as in claim 13 further including a remote control means for enabling the speed control device, the steering control device, and the mechanically powered device to be remotely controlled from a location removed from the tractor.

18. A tractor as in claim 13 further including an engine which burns propane gas which provides power for the propulsion system.

19. A tractor for moving track trailers comprising:

a horizontal frame;

a fifth wheel hitch connector mounted on the frame at a standard height for fifth wheel hitch connectors to enable most truck trailer which are designed to be hitched to fifth wheel connectors to be hitched to the tractor;

four wheels;

a wheel mounting for each of the four wheel, mounting one such wheel to support the frame at each of four locations on said frame which define the corners of a substantially rectangular shape so the mounted wheels provide stable support for the frame;

means for supplying rotational power to each wheel;

a steering mechanism for turning each wheel;

a speed control device for enabling the rotational power supplied to the wheels to be selectively controlled; and a steering control device for enabling the turning of the wheels by the steering mechanisms to be selectively controlled; and wherein:

the overall dimensions of said tractor are less than nine feet in width and less than nine feet in length;

the wheels, the wheel mountings, the frame, and the fifth wheel hitch connector are made of such sufficiently rugged construction that at least ten thousand pounds of tongue weight can be supported by the fifth wheel hitch connector while the tractor pulls a trailer;

the fifth wheel is connected to said frame near the middle of the substantially rectangular shape defined by the locations at which the four wheels support the frame so the tongue weight of any trailer hitched to the fifth wheel will be spread substantially equally among said four wheels.

20. A tractor as in claim 19:

further including:

an internal combustion engine mounted on said frame;

a hydraulic pump mounted on said frame which is driven by said internal combustion engine;

wherein each wheel mounting contains a horizontally rotatable portion upon which one of said wheels is mounted, which rotatable portion is rotably mounted on said frame;

wherein said means for supplying rotational power to each wheel includes a separate hydraulic motor mounted on the rotatable portion of each wheel mounting, which hydraulic motor has means for receiving hydraulic power from said hydraulic pump; and wherein said steering mechanism turns said wheelsby turning said horizontally rotatably portions of said wheel mountings upon which said wheels and said hydraulic motors are located.

21. A tractor as in claim 20, wherein said steering mechanism includes at least one hydraulic piston receiving hydraulic power from said hydraulic pump and being connected between said frame and the rotatable portion of at least one wheel mounting.

22. A tractor as in claim 19 further including:

a powered winch mounted on the frame for winding and unwinding a cable which can be used to pull trailers toward said tractor;

a hydraulic pump;

at least one connection for supplying hydraulic fluid under pressure to an external device, includes a sufficient length of hose to supply such fluid to a trailer which is too far away from the tractor to be connected to the hitch connector; and a powered reel for winding and unwinding that hose.

23. A tractor as in claim 19 further including a remote control means for enabling the speed control device and the steering control device to be remotely controlled from a location removed from the tractor.

24. A tractor as in claim 19 wherein the steering mechanism and steering control device contain means for selectively enabling all of said wheels to be pointed in the same direction for crab steering and means for selectively enabling different pairs of said four wheels to be pointed in different directions for non-crab steering.

25. A tractor as in claim 19 further including an arm having first and second ends:

means for mounting the arm on the frame near the arm's first end so the arm's second end can rotate horizontally;

an additional hitch connector located near the arm's second end to enable a trailer to be hitched to the arm's second end; and a mechanically powered device for selectively rotating the arm relative to the frame.

26. A tractor for moving truck trailers comprising:

a horizontal frame;

an internal combustion engine mounted on said frame;

a hydraulic pump mounted on said frame which is driven by said internal combustion engine;

an arm which has two ends, a mounted end and a swinging end;

means for mounting the arm on the frame near the arm's mounted end so the arm's swinging end can rotate horizontally, said arm having a sufficient length between said mounted end and said swinging end so that the swinging end extends out past the edge of the frame;

a hydraulically powered device for selectively rotating the arm's swinging end relative to the frame:

four wheels;

a separate wheel mounting for each of said wheel, each wheel mounting containing a horizontally rotatable portion upon which one of said wheels is mounted, which rotatable portion is rotably mounted on said frame so the rotatable portion can turn over an angular range of over one-hundred and eighty degrees, said four wheel mountings being located so said wheels provide stable support for the frame;

a separate hydraulic motor mounted on the rotatable portion of each wheel mounting for supplying rotational power to the mounting's wheel, which motor has means for receiving hydraulic power from said hydraulic pump;

a steering mechanism for turning each wheel, said steering mechanism turning said wheels by turning said horizontally rotatably portions of said wheel mountings upon which said wheels and hydraulic motors are located;

a speed control device for enabling the rotational power supplied to the wheels to be selectively controlled; and a steering control device for enabling the turning of the wheels by the steering mechanisms to be selectively controlled;

wherein the overall dimensions of said tractor are less than nine feet in width and less than nine feet in length.

27. A tractor as in claim 26 wherein the arm includes a mechanically powered device for selectively lifting the swinging end of the arm.

28. A tractor as in claim 26 further including a remote control means for enabling the speed control device, the steering control device, and the hydraulically powered device for selectively rotating the arm's swingingend to be remotely controlled from a location removed from the tractor.

29. A tractor as in claim 26 further including:

a powered winch mounted on the frame for winding and unwinding a cable which can be used to pull trailers toward said tractor;

at least one connection for supplying hydraulic fluid under pressure from said hydraulic pump to an external device, includes a sufficient length of hose to supply such fluid to a trailer which is too far away from the tractor to be connected to the hitch connector; and a powered reel for winding and unwinding that hose.

30. A tractor as in claim 26 wherein the steering mechanism and steering control device contain means for selectively enabling all of said wheels to be pointed in the same direction for crab steering and means for selectively enabling different pairs of said four wheels to be pointed in different directions for non-crab steering.

* * * * *